United States Patent
Takeuchi et al.

(10) Patent No.: US 8,411,297 B2
(45) Date of Patent: Apr. 2, 2013

(54) IMAGE FORMING APPARATUS AND IMAGE FORMING SYSTEM INVOLVING SHARING MEMBER INFORMATION AND A CHECK IMAGE BEING ASSOCIATED WITH EACH OTHER

(75) Inventors: Yasuji Takeuchi, Kobe (JP); Tomoyuki Okamoto, Kyoto (JP); Nobuo Kamei, Osaka (JP); Tomo Tsuboi, Itami (JP); Yosuke Taniguchi, Osaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 210 days.

(21) Appl. No.: 13/080,774

(22) Filed: Apr. 6, 2011

(65) Prior Publication Data

US 2011/0255121 A1  Oct. 20, 2011

(30) Foreign Application Priority Data

Apr. 19, 2010 (JP) ................................. 2010-095587

(51) Int. Cl.
*G06K 15/00* (2006.01)
(52) U.S. Cl. ...................... 358/1.14; 358/1.15; 358/1.16; 358/3.28; 235/462.1; 235/462.13; 235/462.14; 705/14.26
(58) Field of Classification Search .................. 358/1.14, 358/1.15, 1.16, 3.28
See application file for complete search history.

(56) References Cited

U.S. PATENT DOCUMENTS

| 7,532,836 | B2 | 5/2009 | Kawabuchi et al. |
| 2004/0184065 | A1 | 9/2004 | Guan et al. |
| 2010/0195135 | A1* | 8/2010 | Ohba .......................... 358/1.14 |
| 2010/0214620 | A1* | 8/2010 | Ishiguro ...................... 358/3.28 |

FOREIGN PATENT DOCUMENTS

| JP | 2005-354141 A | 12/2005 |
| JP | 2006-333388 A | 12/2006 |
| JP | 2008-113433 A | 5/2008 |
| JP | 2008-187724 A | 8/2008 |

OTHER PUBLICATIONS

Office Action (Notice of Reasons for Refusal) dated Apr. 17, 2012, issued in corresponding Japanese Patent Application No. 2010-095587, and an English Translation thereof. (13 pages).

* cited by examiner

*Primary Examiner* — Marivelisse Santiago Cordero
*Assistant Examiner* — Juan M Guillermety
(74) *Attorney, Agent, or Firm* — Buchanan Ingersoll & Rooney PC

(57) ABSTRACT

An image forming system comprises an access control part, a storage part, an extraction part, and an acquisition part. The access control part determines whether to allow or prohibit access to a security image in which a password for access control is embedded. The storage part stores sharing member information which is information on sharing members who are users allowed to share the security image and a check image which is an image for check on the security image, being associated with each other. The extraction part for extracts the check image out of one or more images including the check image on the basis of a determination result on coidentity between the security image and each of the one or more images. The acquisition part acquires the sharing member information associated with the check image. Further, the access control part allows a login user who logs in to the image forming system to have access to the security image without requiring the login user to enter the password on condition that the login user is determined to be one of the sharing members on the basis of the sharing member information.

18 Claims, 20 Drawing Sheets

IMAGE FORMING APPARATUS AND IMAGE FORMING SYSTEM INVOLVING SHARING MEMBER INFORMATION AND A CHECK IMAGE BEING ASSOCIATED WITH EACH OTHER

This application is based on Japanese Patent Application No. 2010-095587 filed on Apr. 19, 2010, the contents of which are hereby incorporated by reference.

BACKGROUND OF THE INVENTION

1. Field of the Invention

The present invention relates to an image forming apparatus and techniques relevant thereto.

2. Description of the Background Art

There is a technique for controlling an operation on image data by using a password in an image forming apparatus.

Japanese Patent Application Laid Open Gazette No. 2005-354141, for example, discloses a technique for prohibiting an access operation (including a printing operation and the like) to image data (also referred to as "security image") in which a password is embedded, when the password which is set in advance is not entered.

In such a technique as shown above, users who are allowed to access the security image are notified of the password in advance. The users are allowed to access the security image by entering the notified password.

In the case where an access control is carried out on the security image only by using the password, however, any user who does not know the password set in the security image can never access the security image. Therefore, it is not easy to ensure flexible handling and the security image cannot be fully put to practical use depending on circumstances.

SUMMARY OF THE INVENTION

It is an object of the present invention to provide a technique for allowing even a user who does not know a password set in a security image to put the security image to practical use while ensuring security.

The present invention is intended for an image forming system. According to a first aspect of the present invention, the image forming system comprises an access control part for determining whether to allow or prohibit access to a security image in which a password for access control is embedded, a storage part for storing a check image which is an image for check on the security image and sharing member information which is information on sharing members who are users allowed to share the security image, being associated with each other, an extraction part for extracting the check image out of one or more images including the check image on the basis of a determination result on coidentity between the security image and each of the one or more images, and an acquisition part for acquiring the sharing member information associated with the check image, and in the image forming system of the present invention, the access control part allows a login user who logs in to the image forming system to have access to the security image without requiring the login user to enter the password on condition that the login user is determined to be one of the sharing members on the basis of the sharing member information.

The present invention is also intended for an image forming apparatus. According to a second aspect of the present invention, the image forming apparatus comprises an access control part for determining whether to allow or prohibit access to a security image in which a password for access control is embedded, and an acquisition part for acquiring sharing member information which is information on sharing members who are registered in advance as users allowed to share the security image, and in the image forming apparatus of the present invention, the sharing member information is stored, being associated with a check image generated as an image for check on the security image, the acquisition part acquires the sharing member information associated with the check image extracted on the basis of an operation for determining coidentity with the security image, and the access control part allows a login user who logs in to an image forming system to have access to the security image without requiring the login user to enter the password on condition that the login user is determined to be one of the sharing members on the basis of the sharing member information.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, the preferred embodiments of the present invention will be discussed with reference to the accompanying drawings.

1. The First Preferred Embodiment

1-1. System Configuration

Figure 1:
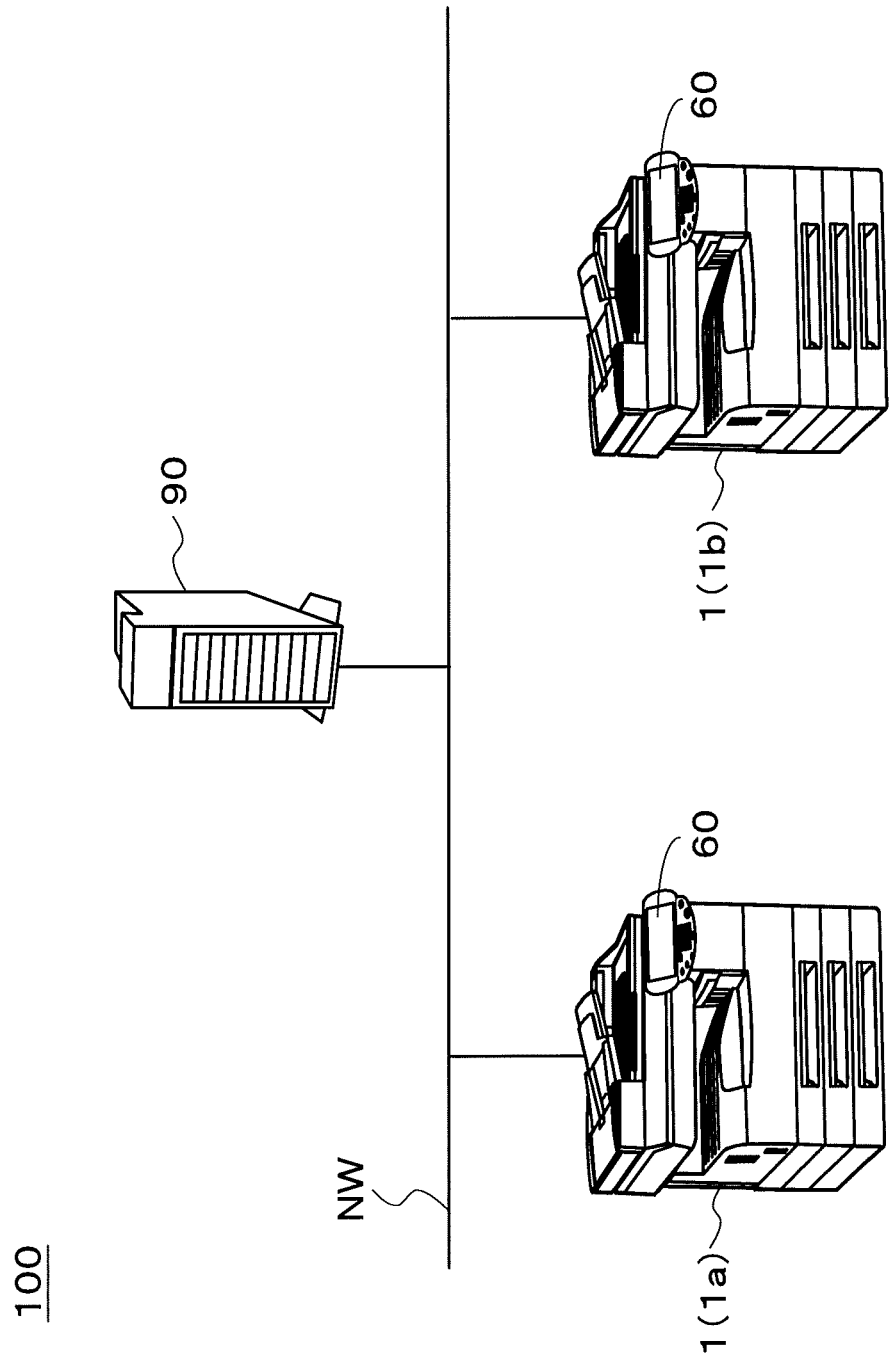
FIG. 1 is a schematic view showing a configuration of an image forming system.

FIG. 1 is a schematic view showing a configuration of an image forming system 100. The image forming system 100 comprises a server computer (referred to simply as "a server") 90 and a plurality of image forming apparatuses 1 (in detail, 1a and 1b).

The server 90 and the plurality of image forming apparatuses 1 are connected to one another via a network NW. Among the server 90 and the image forming apparatuses 1, data can be transmitted and received to/from one another via the network NW. The network NW includes various networks such as a LAN (Local Area Network), a WAN (Wide Area Network), the interact, and the like.

Herein, the image forming apparatus 1 is configured as a Multi Function Peripheral (abbreviated as "MFP"). The MFP is an apparatus (also referred to as a multifunction machine) comprising a scanner function, a printer function, a copy function, a facsimile communication function and the like.

The plurality of image forming apparatuses 1a and 1b each have such a schematic constitution as described below.

Figure 2:
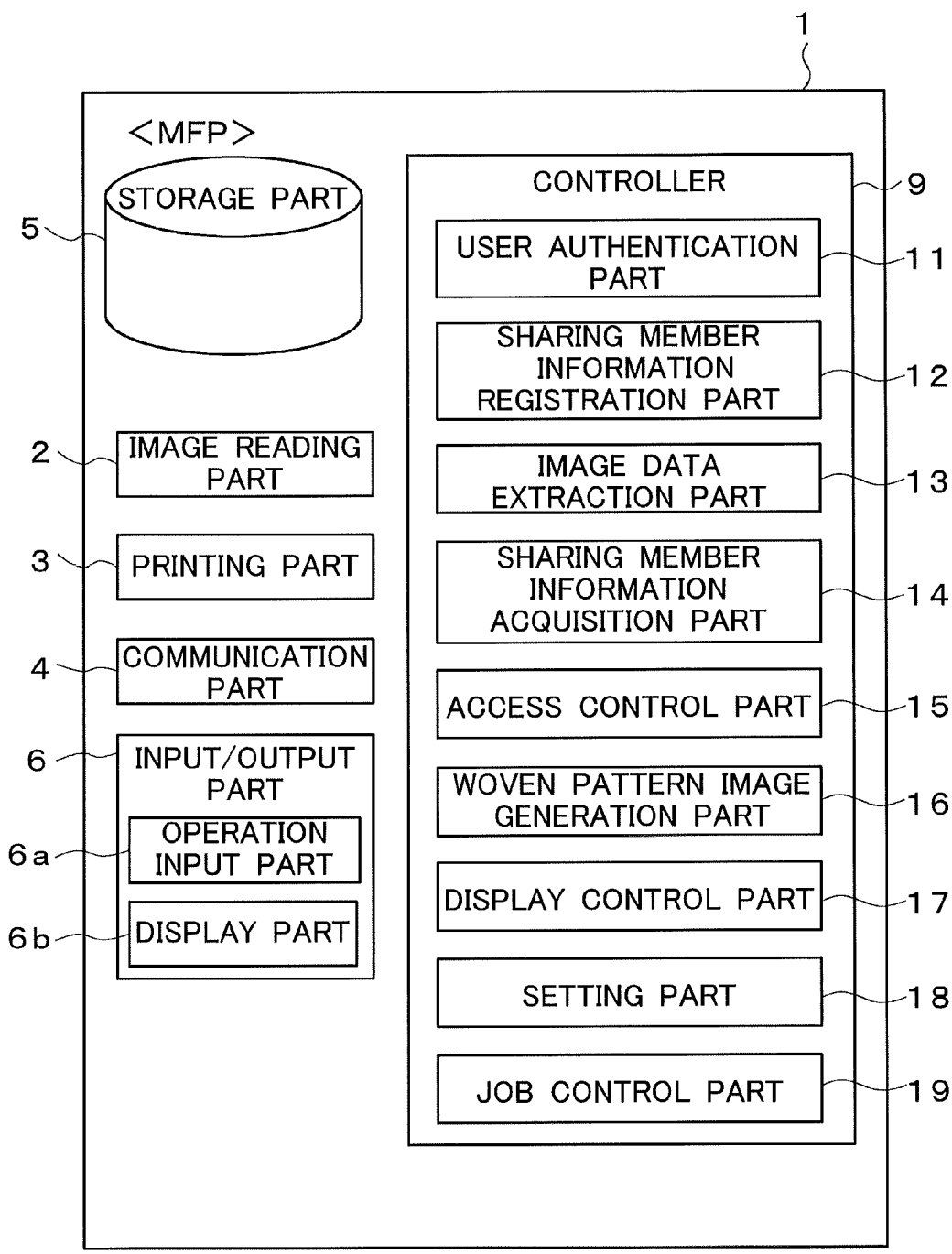
FIG. 2 is a diagram showing functional blocks of an image forming apparatus.

FIG. 2 is a functional block diagram showing a schematic constitution of the image forming apparatus 1. As shown in FIG. 2, the image forming apparatus 1 comprises an image reading part 2, a printing part 3, a communication part 4, a storage part 5, an input/output part 6, a controller 9, and the like and multiply uses these constituent parts to implement various functions.

The image reading part 2 is a processing part which optically reads an original manuscript placed on a predetermined position of the image forming apparatus 1 and generates an scan image of the original manuscript. The image reading part 2 can also read a printed matter (hereinafter, also referred to as a "security manuscript") having a woven pattern (background pattern) image in which a password is embedded, or the like, to generate a scan image. Since the password is inherited to the scan image in order to ensure security, the scan image is also referred to as a security image.

The printing part 3 is an output part which prints out an object image to various media such as paper on the basis of image data on the image. The printing part 3 can print the scan image generated by the image reading part 2.

The communication part 4 is a processing part capable of performing facsimile communication via public networks or the like. Further, the communication part 4 is capable of performing network communication via the communication network NW. The network communication uses various protocols such as TCP/IP (Transmission Control Protocol/Internet Protocol), FTP (File Transfer Protocol), and the like, and by using the network communication, the image forming apparatus 1 can transmit and receive various data to/from desired partners.

The storage part 5 is a storage device such as a hard disk drive (HDD), a nonvolatile memory, or/and the like. In the storage part 5, stored is the scan image (image data) generated by the image reading part 2, and the like.

The input/output part 6 comprises an operation input part 6a for receiving an input given to the image forming apparatus 1 and a display part 6b for performing an display output of various information. Specifically, the image forming apparatus 1 is provided with an operation panel part 60 (see FIGS. 1 and 6) serving as the input/output part 6. The operation panel part 60 is provided with a hardware key 61 (BN1 to BN4 and the like) a touch screen 63.

The hardware key 61 serves as part of the operation input part 6a. Specifically, the hardware key 61 includes a copy function selection button BN1, a scan function selection button BN2, a box function selection button BN3, a start button BN4, and other buttons (numeric keypad and the like).

The touch screen 63 is a liquid crystal display panel in which a piezoelectric sensor or the like is embedded, serving as part of the display part 6b and also as part of operation input part 6a. In more detail, the touch screen 63 is capable of displaying various information on the liquid crystal display panel and detecting a manipulation position of a finger of an operator on the liquid crystal display panel to receive various inputs. When the finger of the operator touches a virtual button displayed on the touch screen 63, for example, such a manipulation is regarded as a pressing operation on the virtual button.

Thus, the input/output part 6 is capable of receiving input operations (e.g., various setting operations using a menu screen, and the like) performed by the operator.

The controller 9 is a control device for generally controlling the image forming apparatus 1. The controller 9 is a computer system which is embedded in the image forming apparatus 1 and comprises a CPU and various semiconductor memories (RAM, ROM, and the like). Various processing parts operate under the control of the controller 9 to implement various functions of the image forming apparatus 1. The controller 9 causes the CPU to execute a predetermined software program (hereinafter, referred to simply as a "program") PG stored in the ROM (e.g., EEPROM or the like), to thereby implement various processing parts. Further, the program PG may be downloaded via the network NW or acquired via various portable recording media (e.g., a USB memory and the like).

Specifically, the controller 9 implements various processing parts including a user authentication part 11, a sharing member information registration part 12, an image data extraction part 13, a sharing member information acquisition part 14, an access control part 15, a woven pattern image generation part 16, a display control part 17, a setting part 18, and a job control part 19.

The user authentication part 11 is a processing part for performing user authentication.

The sharing member information registration part 12 is a processing part which registers a check image which is an image for check on a security image and sharing member information which is information on users allowed to share the security image (who are also referred to as "sharing members"), being associated with each other, in an operation for generating the security image. The registration information including the check image and the sharing member information is stored in a database SQ (FIG. 5) provided in a storage part or the like of the server 90.

The image data extraction part 13 extracts the check image out of a plurality of images including the check image on the basis of a determination result on coidentity between the scan image (security image) of the security manuscript and each of the plurality of images. When a single check image is stored in the storage part of the server 90, the image data extraction part 13 extracts the check image out from the database SQ if the check image is determined to be identical to the security image.

The sharing member information acquisition part 14 is a processing part for acquiring the sharing member information from the database SQ, which is associated with the check image extracted by the image data extraction part 13.

The access control part 15 is a processing part for determining whether to allow or prohibit access to the security image in which the password for access control is embedded.

The woven pattern image generation part 16 is a processing part for generating a woven pattern image in which the password is embedded, on the basis of the password set by a user.

The display control part 17 is a processing part for controlling the display content on the touch screen 63 or the like in the operation panel part 60.

The setting part 18 is a processing part for performing a setting operation for various set items in accordance with the operation input from the operation panel part 60.

The job control part 19 is a processing part, cooperating with the access control part 15 and the like, for performing job controls such as a print control operation, a scan control operation, and the like.

1-2. Operation

In the first preferred embodiment, discussion will be made on an exemplary case where an image relating to an attendance report is transmitted and received as a security image between a temporary staff employment agency (referred to as a "temp agency") CP and a plurality of temporary staff (referred to as "temp staff") EA, EB, EC, and the like.

Hereafter, an operation for generating the security image, an operation for printing a security manuscript (the primary use operation), and an operation for sending the security manuscript (the secondary use operation) will be sequentially discussed.

<1-2-1. Operation for Generating Security Image>

Figure 3:
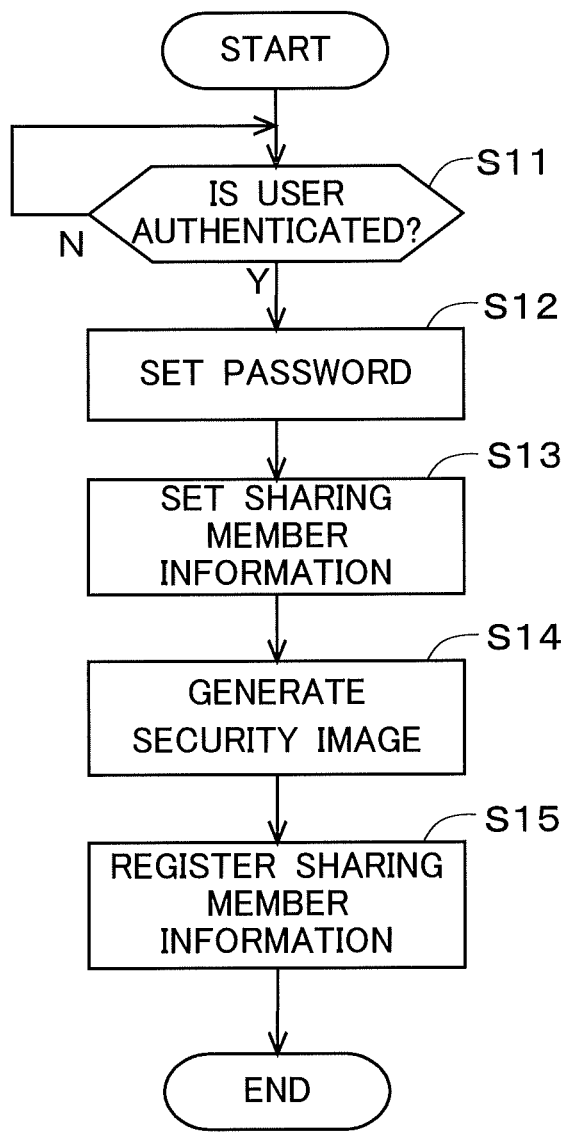
FIG. 3 is a flowchart showing an operation flow of the image forming apparatus.
Figure 4:
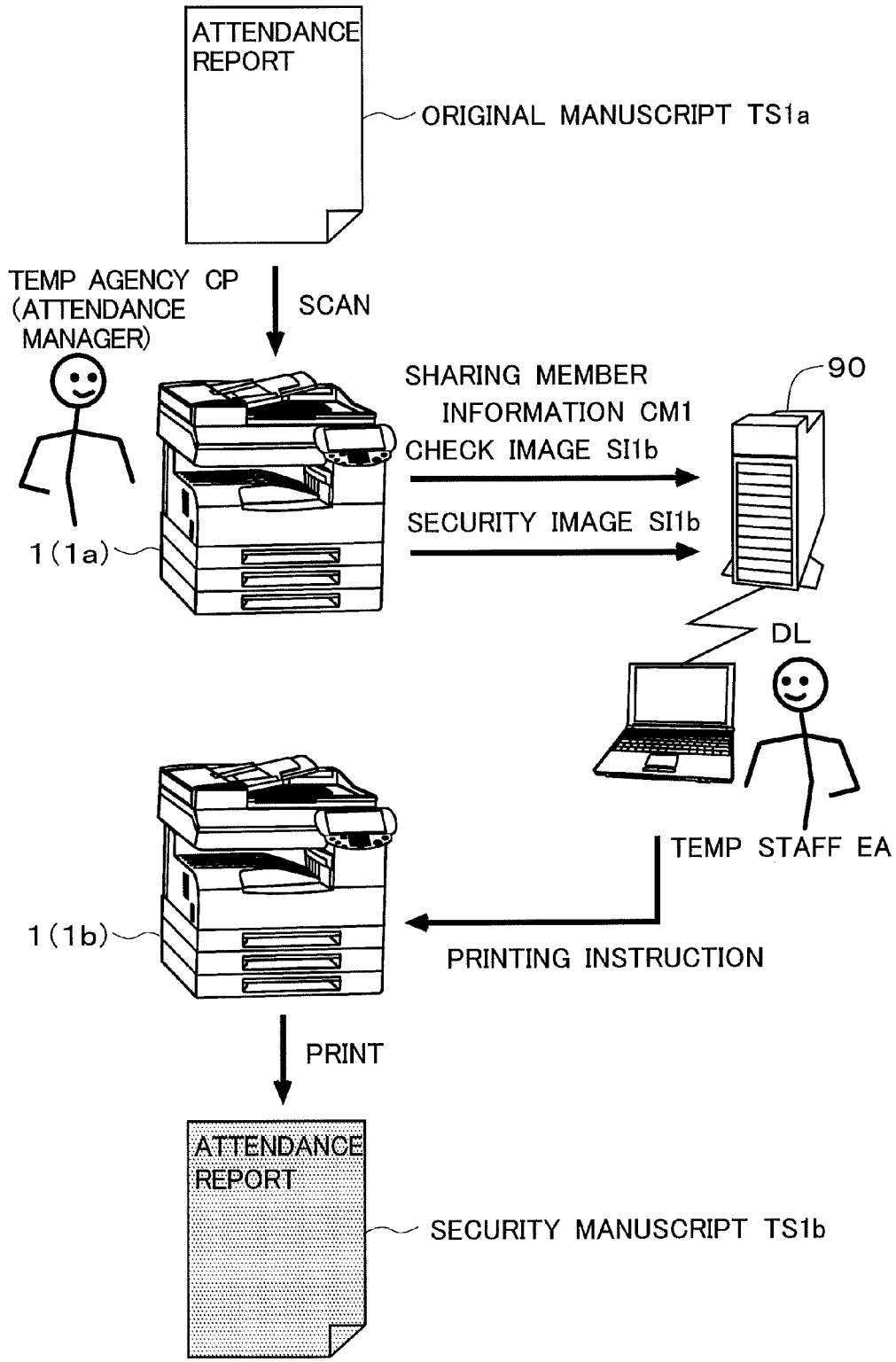
FIG. 4 is a conceptual diagram showing an operation of the image forming apparatus.
Figure 5:
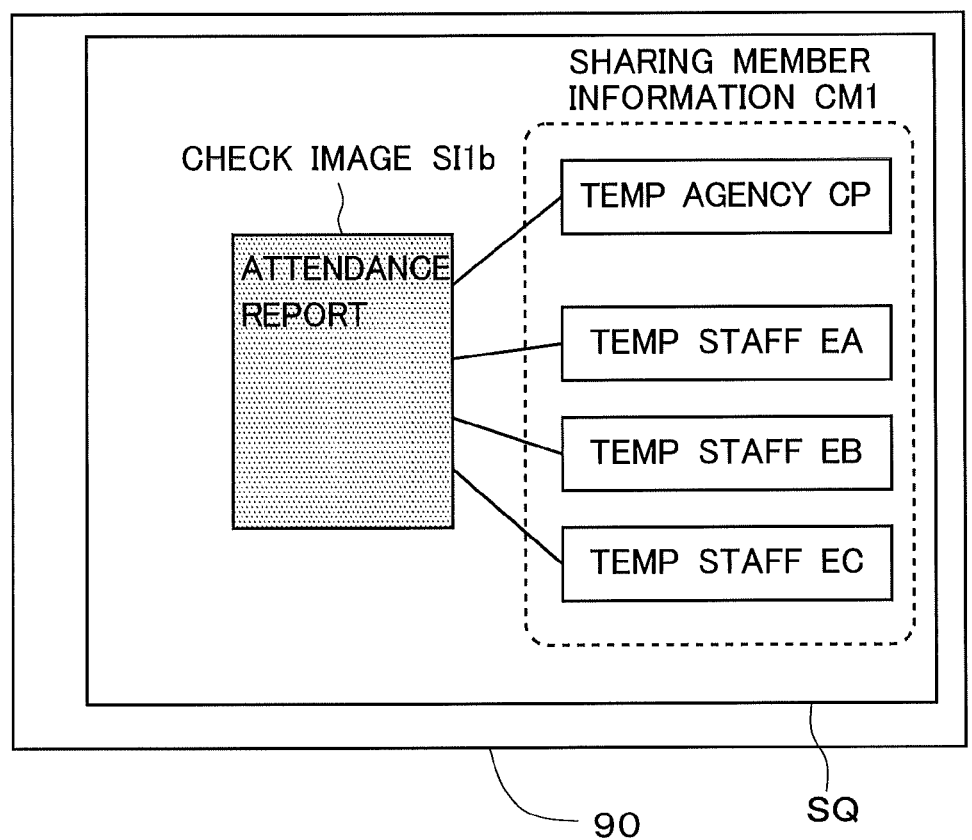
FIG. 5 is a conceptual diagram showing a check image and sharing member information.
Figure 6:
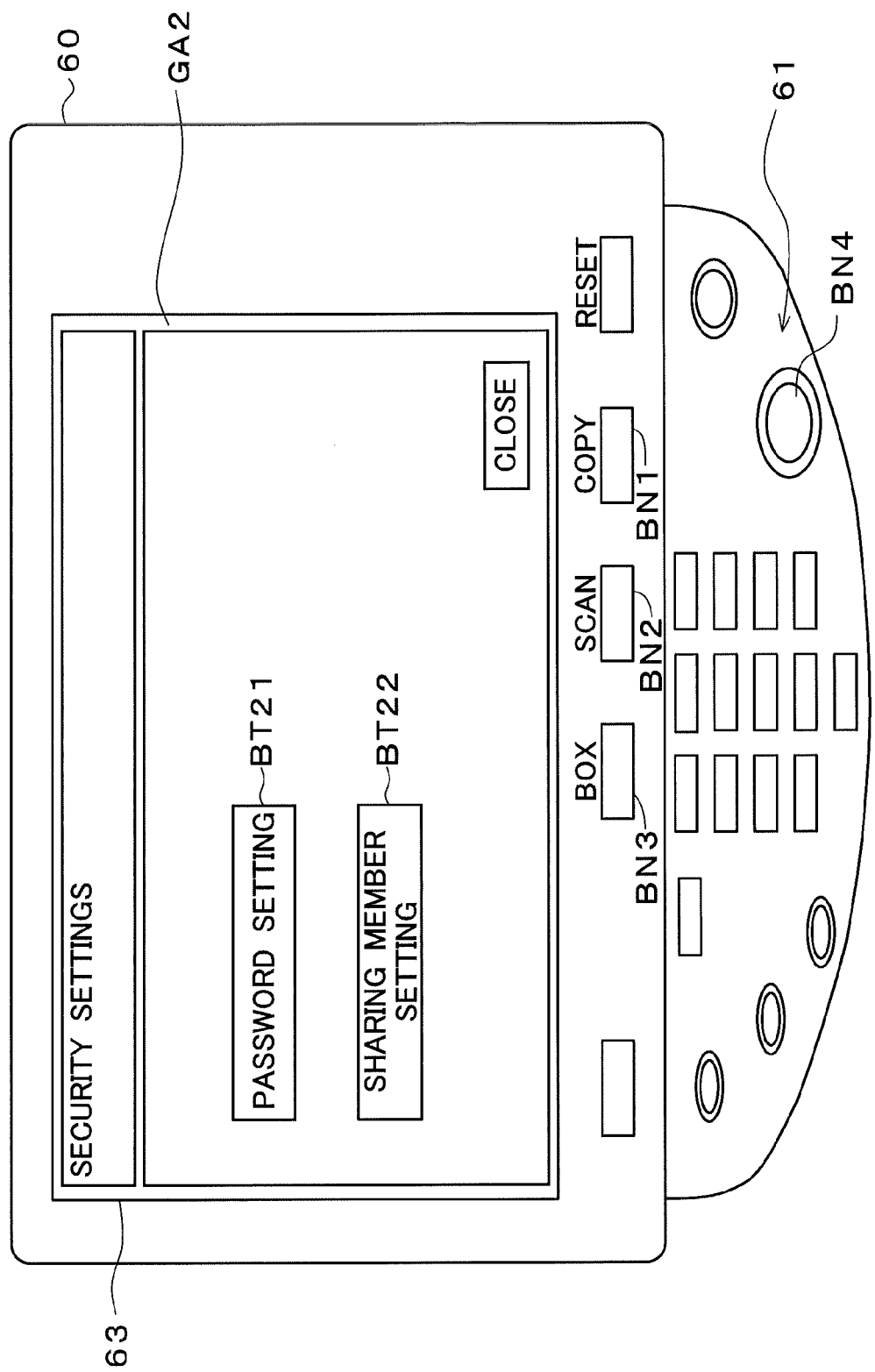
FIG. 6 is a view showing a display screen for security settings.
Figure 7:
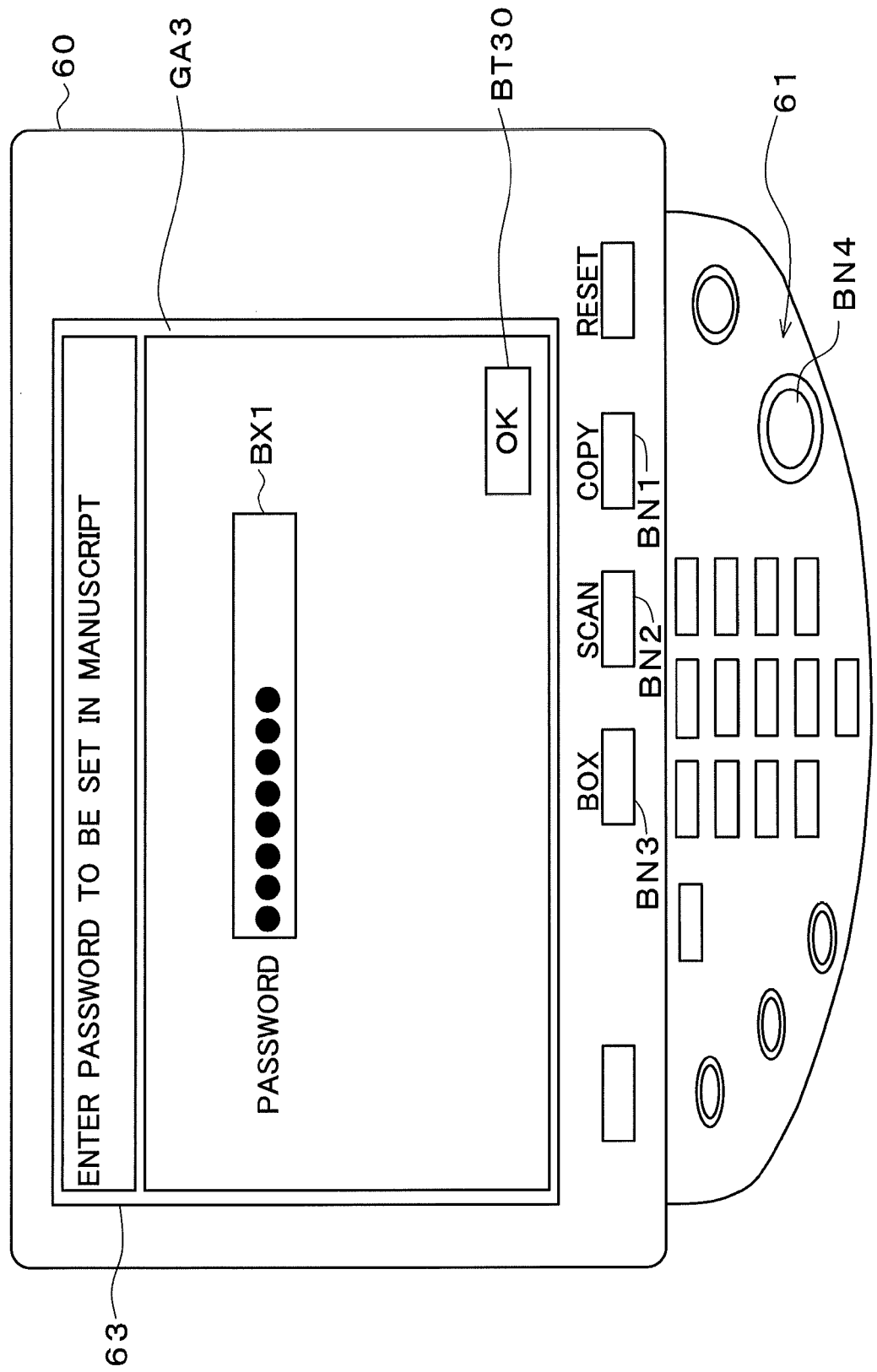
FIG. 7 is a view showing a display screen for password setting.
Figure 8:
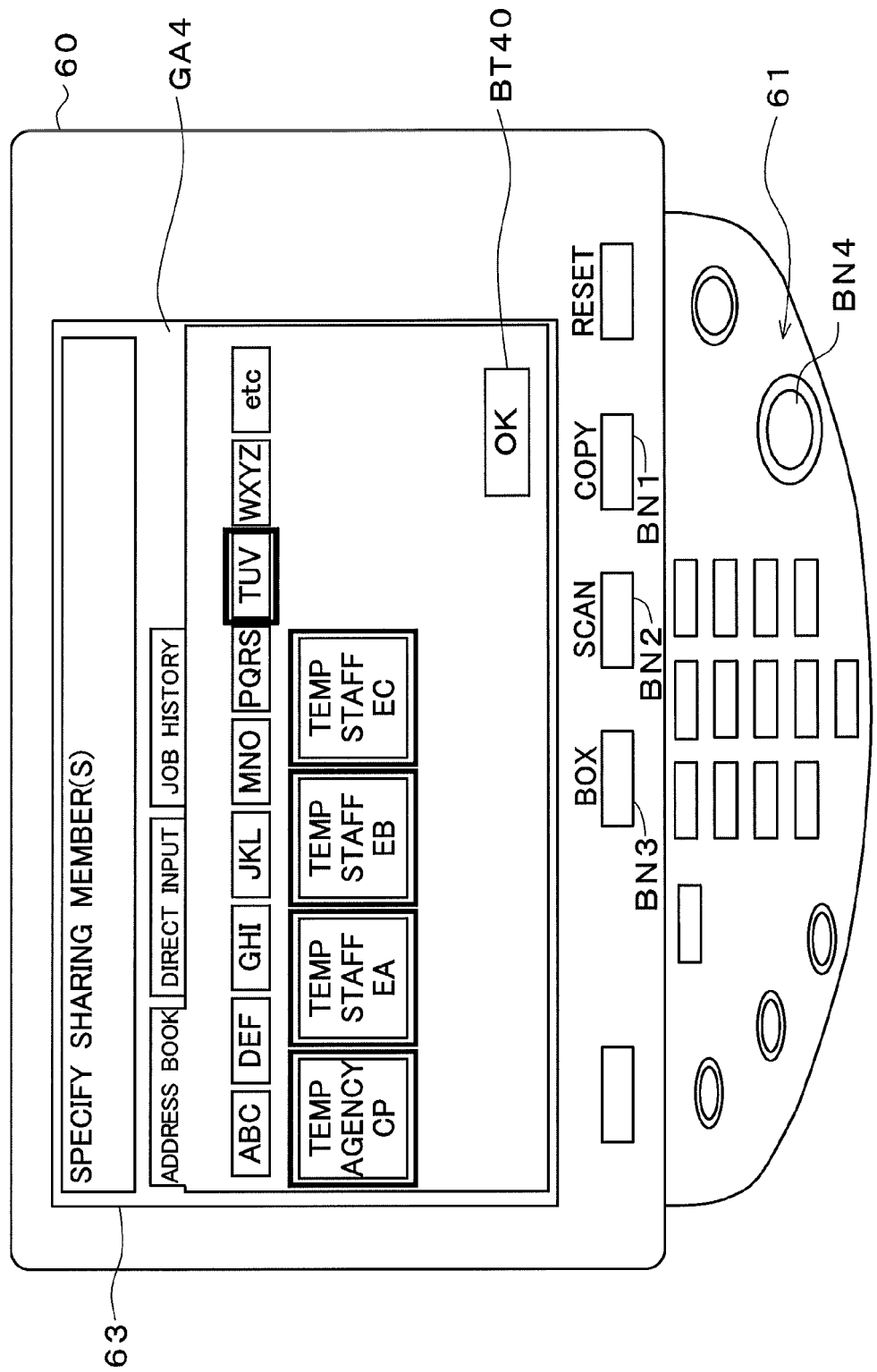
FIG. 8 is a view showing a display screen for specification of sharing members.

First, with reference to FIGS. 3 to 8, discussion will be made on an operation for generating the security image performed by the image forming apparatus 1. FIG. 3 is a flowchart showing an operation flow of the image forming apparatus 1 and FIG. 4 is a conceptual diagram showing the operation of the image forming apparatus 1. FIG. 5 is a conceptual diagram showing a check image and sharing member information stored into the database SQ provided in the storage part of the server 90. FIGS. 6 to 8 are views each showing the operation panel part 60 of the image forming apparatus 1.

In the first preferred embodiment, discussion will be made on such a case as shown in FIG. 4, where the image forming apparatus 1a generates a security image SI1b of an original manuscript TS 1a relating to an attendance report in accordance with an operation of a user in the temp agency CP (e.g., an attendance manager), as one exemplary case of the operation for generating the security image. The operation for generating the security image SI1b includes an operation of storing a check image SI1b and sharing member information CM1, being associated with each other, in the database SQ provided in the server 90.

Specifically, first, the image reading part 2 reads the original manuscript TS1a to generate a scan image of the original manuscript TS1a. After the scan image of the original manuscript TS1a is generated, the image forming apparatus 1a overlays the scan image of the original manuscript TS1a on a woven pattern image SP1 (not shown) in which a password is embedded, to thereby obtain the security image SI1b. The sharing member information registration part 12 stores the check image SI1b and the sharing member information CM1 being associated with each other into the database SQ provided in the storage part of the server 90 as shown in FIG. 5. In this case, the security image SI1b itself is used as the check image SI1b. The sharing member information CM1 is information on sharing members specified by the user in advance as users allowed to share the security image SI1b as discussed later.

By printing the security image (primary image) SI1b, a printed matter (hereinafter, also referred to as a "security manuscript") TS1b is generated as discussed later. In the security manuscript TS1b, printed is the woven pattern image SP1 included in the security image SI1b. When the image reading part 2 reads the security manuscript TS1b, a scan image (hereinafter, also referred to as a "security image") SI1c is generated. This security image SI1c also includes the woven pattern image SP1. Thus, the woven pattern image SP1 included in the security image SI1b is inherited to a new scan image (security image) SI1c of the next generation (discussed later) and the like. In other words, to scan images newly generated through generation update, the woven pattern image SP1 included in the security image (primary image) SI1b is repeatedly added. Therefore, the password embedded in the woven pattern image SP1 is valid for not only the first-generation security image SI1b but also the next-generation and following security images (SI1c and the like). Specifically, the access restriction with the password embedded in the woven pattern image SP1 is carried out on each of the first-generation security image SI1b and the following-generation security images (SI1c and the like).

Further, in the first preferred embodiment, the check image SI1b for the security image (primary image) SI1b can be also used as check images for new security images (secondary images) SI1c and the like of the following generations. In other words, the check image SI1b is a common check image for all-generation security images. Similarly, the users allowed to share the security image (primary image) SI1b are also users allowed to share the following-generation security images (secondary images) SI1c and the like. In other words, the users allowed to share the security image (primary image) SI1b are also sharing users common to all-generation security images.

With reference to the flowchart of FIG. 3, discussion will be made in more detail on the operation for generating such a security manuscript.

In Step S11, after the original manuscript TS1a is placed on a predetermined position of the image forming apparatus 1a, the user authentication part 11 of the image forming apparatus 1a executes a user authentication process (login process).

First, the user (user in the temp agency CP) enters his user ID and password in the operation panel part 60. Then, the user authentication part 11 communicates with the server 90 and performs the user authentication. In more detail, the user authentication part 11 transmits the inputted user ID and password to the server 90, and then the server 90 checks if there is an authorized user ID which is coincident with the received user ID and checks if the received password is coincident with the authorized password. After it is determined that both the received user ID and password are authorized, the server 90 notifies the image forming apparatus 1a of the authentication result of "login allowed". In response to the authentication result, the image forming apparatus 1a allows the user to log in thereto and the process goes to Step S12. On the other hand, when an unauthorized ID or an unauthorized password is entered, the server 90 notifies the image forming apparatus 1a of the authentication result of "login not allowed" and the image forming apparatus 1a is brought into a waiting condition for login information to be entered again.

In Step S12, the image forming apparatus 1a sets the password to be embedded in the woven pattern image SP1 (the password for access control on the security image) on the basis of the operation input of the user.

Specifically, the user causes a screen GA2 to be displayed on the touch screen 63 in the operation panel part 60 (see FIG. 6). In the screen GA2, as shown in FIG. 6, displayed are (virtual) buttons BT21 and BT22 for setting items relating to "password" and "sharing members", respectively. When the user presses the button BT21, a screen GA3 (for setting a password) is displayed on the touch screen 63 (see FIG. 7). In the screen GA3, as shown in FIG. 7, displayed is a (virtual) box (password input field) BX1 for entering a password. The user uses the operation input part 6a to enter a password to be set in the woven pattern image SP1 (in other words, the security image) and presses a button BT30 ("OK"). The image forming apparatus 1a sets the password entered in the box BX1 as the password to be embedded in the woven pattern image SP1. The password to be set in the woven pattern image SP1 (in other words, the security image) is set differently from the password for login.

In Step S13, the image forming apparatus 1a sets sharing member information which is information on users allowed to share the security image on the basis of the operation input of the user.

Specifically, the user causes the screen GA2 (discussed above) to be displayed on the touch screen 63 in the operation panel part 60 (see FIG. 6). When the user presses the button BT22, a screen GA4 is displayed on the touch screen 63 (see FIG. 8). In more detail, in FIG. 8, a setting screen relating to "registered destinations (address book)" is displayed on the touch screen 63. In the setting screen relating to the registered destinations, as shown in FIG. 8, (virtual) buttons corresponding to destinations registered in advance in the image forming apparatus 1a are displayed on the touch screen 63. By pressing these buttons, the user can select desired destinations (i.e., sharing members). As shown in FIG. 8, when one of these buttons corresponding to the user's desired destination is selected, the selected button is highlighted (enclosed by a thick line in FIG. 8). The destinations are registered in alphabetical order, and in the case shown in FIG. 8, the registered destinations whose names start with "T", "U", or "V" are displayed. In the first preferred embodiment, taken is a case as an example, where the user selects "temp agency CP", "temp staff EA", "temp staff EB", and "temp staff EC" as the sharing members. After selection of the desired destinations is completed, the user presses a button BT40 ("OK") in the setting screen GA4. Then, the image forming apparatus 1a sets the destinations selected by the user, i.e., "temp agency CP", "temp staff EA", "temp staff EB", and "temp staff EC", as information on the sharing members.

In Step S14, when the start button BN4 in the screen GA4 is pressed, the image reading part 2 reads the original manuscript TS1a to generate a scan image. Further, in Step S14, the woven pattern image generation part 16 generates the woven pattern image SP1 on the basis of the password set in Step S12 and overlays the scan image of the original manuscript TS1a on the woven pattern image SP1, to thereby obtain the security image SI1b.

In Step S15, the sharing member information registration part 12 registers the check image SI1b and the sharing member information CM1, being associated with each other, into the database SQ provided in the storage part of the server 90, as shown in FIG. 5. Specifically, the sharing member information registration part 12 transmits the check image SI1b and the sharing member information CM1 to the server 90 and stores the image SI1b and the information CM1 into the database SQ provided in the server 90. As discussed above, the security image SI1b itself is used as the check image SI1b. The sharing member information CM1 is information on the users allowed to share the security image SI1b and specifically, is information on the sharing members specified in Step S13.

Thus, the image forming apparatus 1a generates the security image SI1b on the basis of the original manuscript TS1a. Further, the image forming apparatus 1a transmits the check image SI1b and the sharing member information CM1 to the server 90 and stores the check image SI1b and the sharing member information CM1, being associated with each other, into the database SQ provided in the storage part of the server 90.

<1-2-2. Operation for Printing Security Manuscript (The Primary Use Operation)>

Next, discussion will be an operation for printing security manuscript (the primary use operation).

The user in the temp agency CP (e.g., the attendance manager) generates the security image SI1b of the original manuscript TS1 relating to the attendance report (see FIG. 4) through the above-discussed operation and then uploads electronic data on the security image SI1b to the WEB page of the temp agency CP.

After that, the temp staff EA registered in the temp agency CP accesses the WEB page of the temp agency CP, downloads the electronic data on the security image SI1b, and prints out the electronic data by using the image forming apparatus 1b. By this operation, the attendance report is printed out. At this point of time immediately after the printing out, however, no information on attendance is written in the attendance report yet.

In this case, since no access restriction is needed for the attendance report in which no information on attendance is written, no access restriction is carried out in the primary use. Then, the access restriction is carried out only in an operation of using the attendance report in which some information on attendance is written, and specifically, only in the secondary use operation relating to the security image SI1b, and the following operations. Whether to perform the access restriction may be determined, for example, on the basis of generation information embedded in the security image SI1b.

This is, however, only one exemplary case and there may be another case where the temp staff EA enters the password set in the security image SI1b so as to be given permission for access to the security image SI1b and prints out the security image SI1b. Further, the user may be given permission for printing without entering the password by using such sharing member information as discussed later.

After that, the temp staff EA handwrites necessary information on attendance and the like in the printed security manuscript TS1b.

Further, the temp staff EA uses the image forming apparatus 1b to send the scan image of the security manuscript TS1b to the temp agency CP via facsimile transmission. Hereafter, this sending operation will be discussed in detail.

<1-2-3. Operation for Sending Scan Image of Security Manuscript (The Secondary Use Operation>

Figure 9:
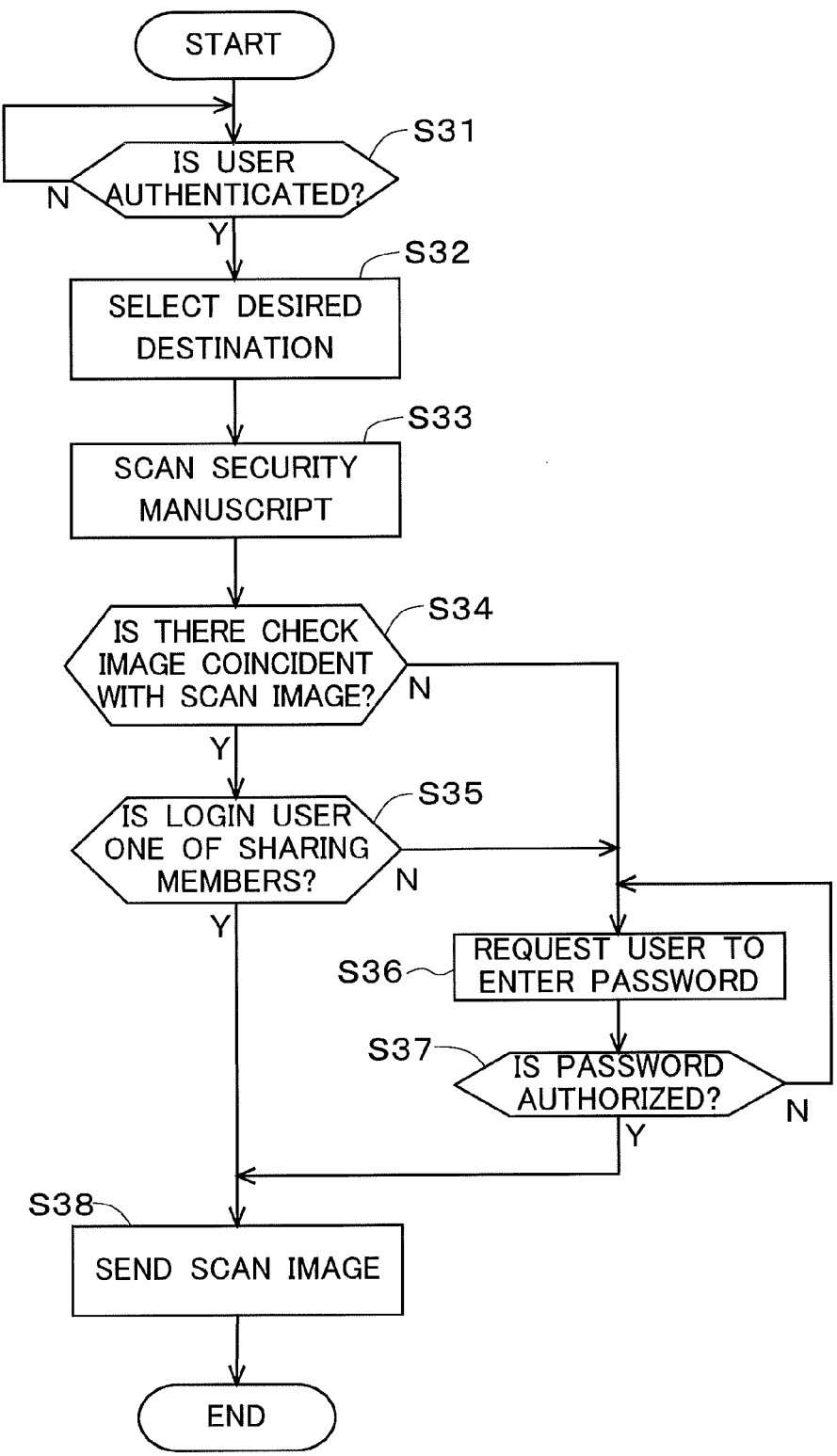
FIG. 9 is a flowchart showing another operation flow of the image forming apparatus.
Figure 10:
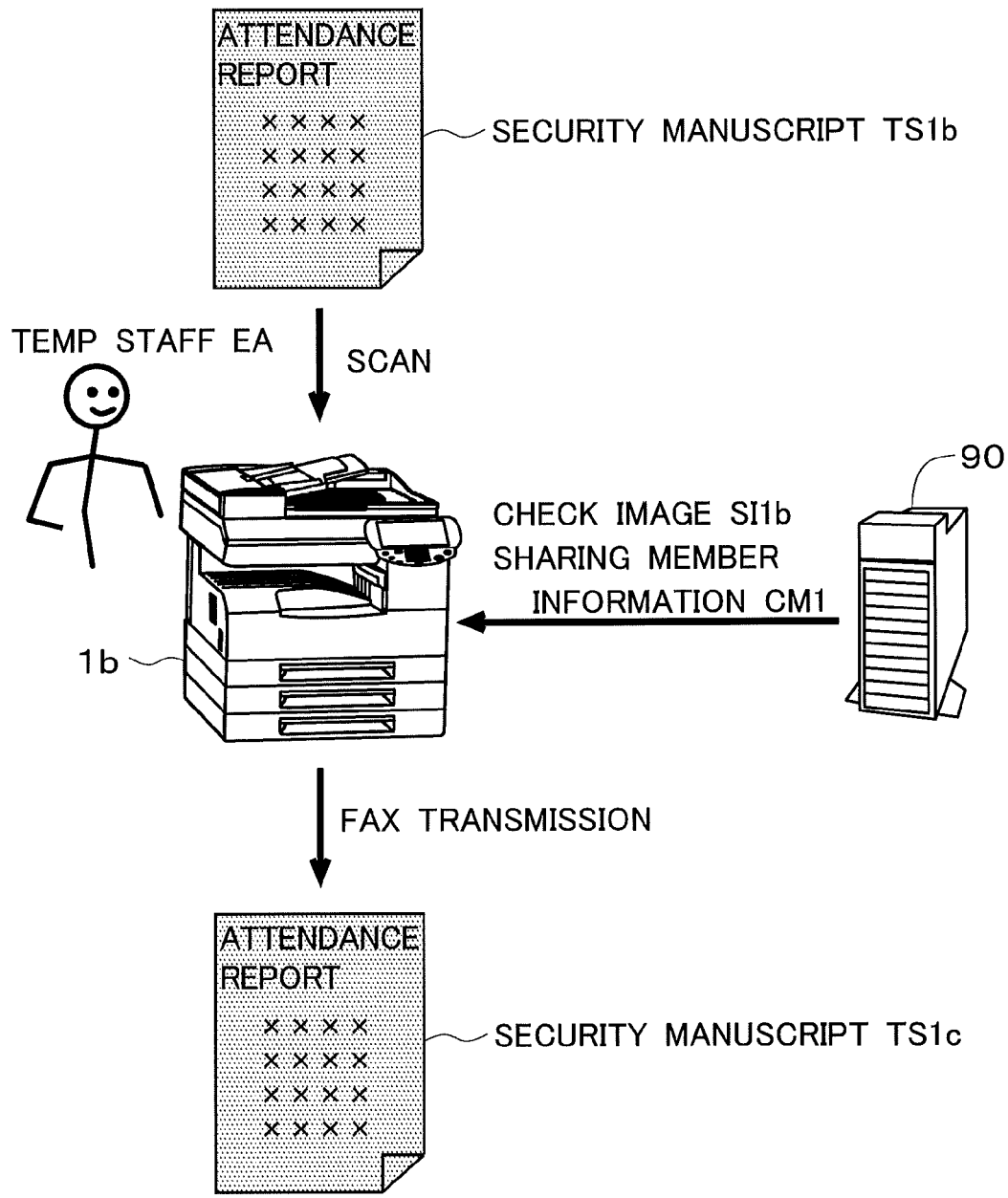
FIG. 10 is a conceptual diagram showing still another operation of the image forming apparatus.
Figure 11:
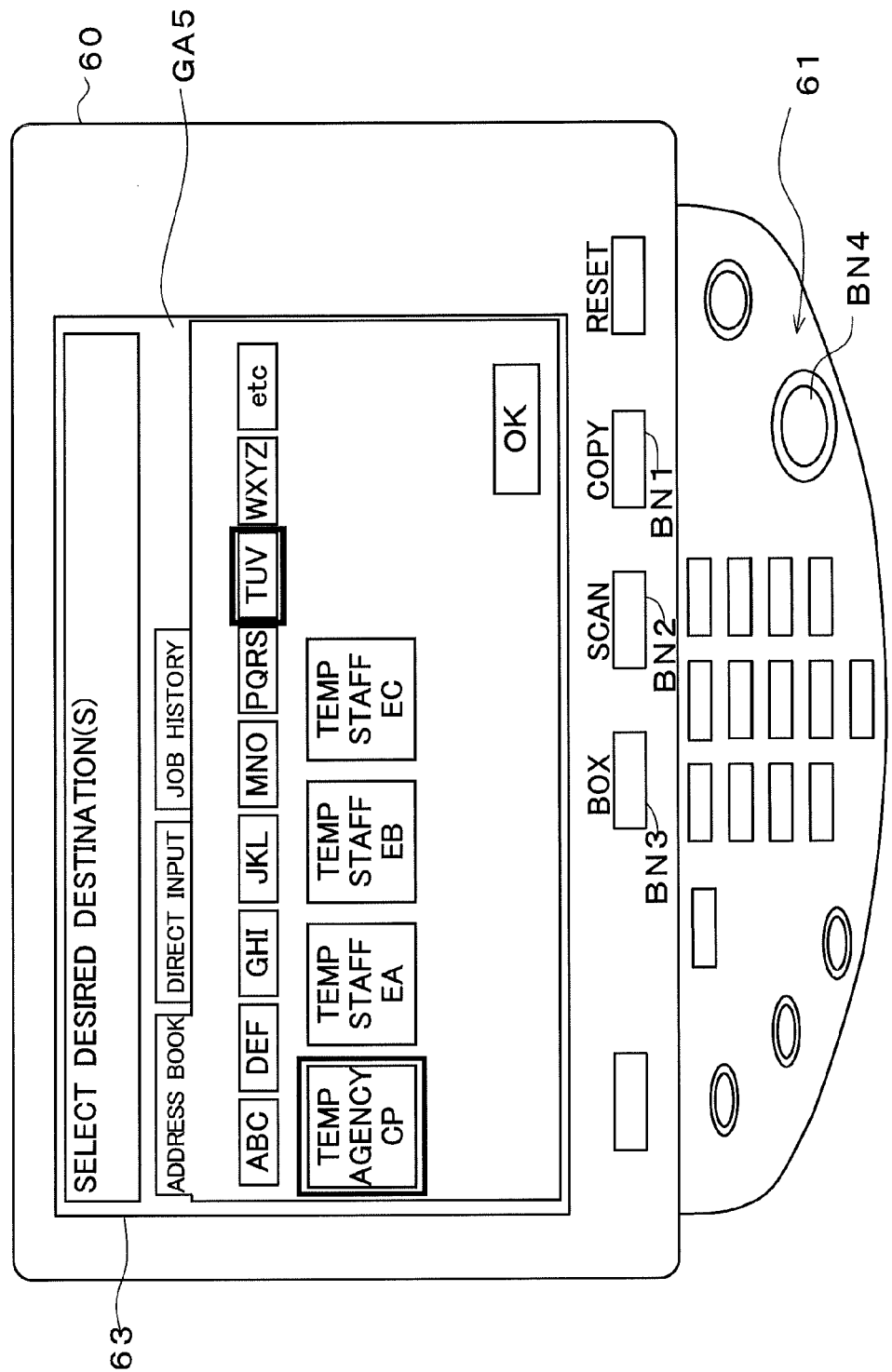
FIG. 11 is a view showing a display screen for selection of destinations.
Figure 12:
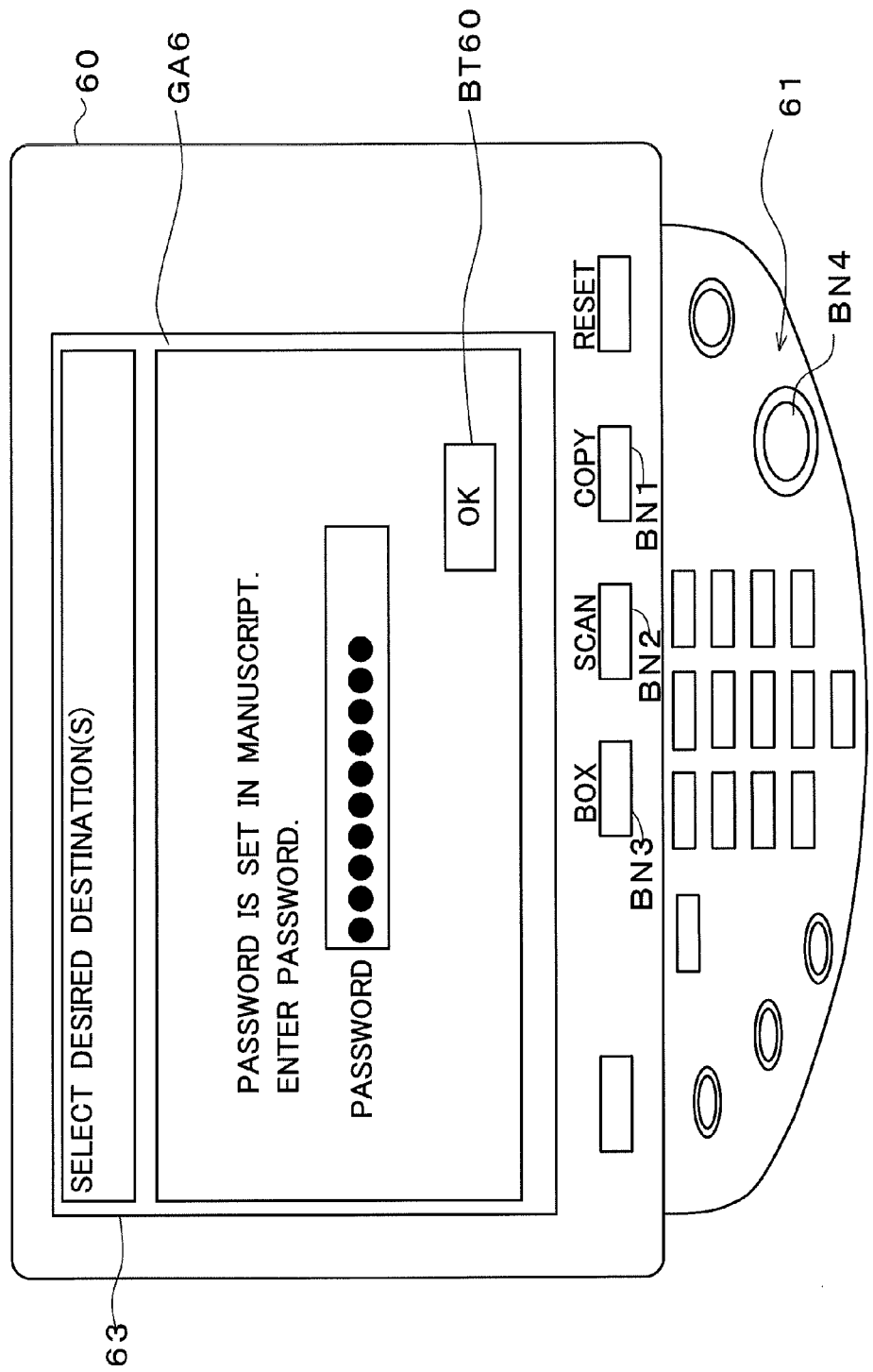
FIG. 12 is a view showing a display screen for request to enter a password.

Next, with reference to FIGS. 9 to 12, discussion will be made on an operation for sending the scan image of the security manuscript. FIG. 9 is a flowchart showing an operation flow of the image forming apparatus 1b. FIG. 10 is a conceptual diagram showing the operation of the image forming apparatus 1*b*. FIGS. 11 and 12 are views each showing the operation panel part 60 of the image forming apparatus 1*b*.

Hereinafter, discussion will be made on such a case as shown in FIG. 10 where the temp staff EA who is one of the sharing members uses the image forming apparatus 1*b* to send the scan image of the security manuscript TS1*b* to the temp agency CP via facsimile transmission as discussed above, as one exemplary operation for sending the scan image of the security manuscript.

With reference to the flowchart of FIG. 9, discussion will be made in detail below on the operation for sending the scan image of the security manuscript TS1*b*.

Herein, discussion will be made on an exemplary case where the operation for sending the scan image is allowed without entering the password by using the sharing member information. Further, also by entering the password set in the security manuscript TS1*b*, the temp staff EA is allowed to have access to the security image SI1*b* (discussed later) which is the scan image of the security manuscript TS1*b* and can print the security image SI1*b*.

First, when the security manuscript TS1*b* is placed on a predetermined position of the image forming apparatus 1*b*, in Step S31 of FIG. 9, the user authentication part 11 of the image forming apparatus 1*b* executes a user authentication process (login process). Specifically, the user authentication part 11 performs the same operation of Step S11 shown in FIG. 3. Then, the temp staff EA logs in to the image forming apparatus 1*b* as a login user.

In Step S32, the image forming apparatus 1*b* specifies a destination user to whom the scan image of the security manuscript TS1*b* will be sent.

Specifically, the temp staff EA presses the button BN2 (scan function) in the operation panel part 60, to thereby display a screen GA5 (for selecting a destination) on the touch screen 63 (see FIG. 11). The temp staff EA selects a desired destination user to whom the scan image of the security manuscript TS1*b* will be sent in the screen GA5. In this case, it is assumed that the temp staff EA selects the "temp agency CP" as the destination user. After the destination user is selected, the image forming apparatus 1*b* sets the destination user selected by the temp staff EA as the destination user to whom the scan image of the security manuscript TS1*b* will be sent.

In Step S33, when the button BN4 (start button) is pressed, the image reading part 2 reads the security manuscript TS1*b* to thereby generate a scan image (hereinafter, also referred to as a "security image") SI1*c* (not shown). Further, in Step S33, the image reading part 2 also extracts the password included in the security image SI1*c*.

In Step S34, the image data extraction part 13 extracts the check image SI1*b* from the database SQ provided in the storage part of the server 90 on the basis of the determination result on coidentity between the security image SI1*c* and each of the images (the check image SI1*b* (see FIG. 5) and the like) stored in database SQ provided in the storage part of the server 90. Specifically, the image data extraction part 13 extracts the check image SI1*b* which is determined to be identical to the security image SI1*c*.

In Step S35, the sharing member information CM1 associated with the check image SI1*b* is acquired by the sharing member information acquisition part 14, and it is checked if the temp staff EA (login user) is one of the sharing members on the basis of the sharing member information CM1. When the login user is determined to be one of the sharing members, the process goes to Step S38, and when the login user is not determined to be one of the sharing members, the process goes to Step S36. In the first preferred embodiment, in Step S15 of FIG. 3, the information on the temp staff EA is associated with the check image SI1*b*, as the sharing member information CM1, and registered (see FIG. 5). Therefore, in Step S35 of FIG. 9, the temp staff EA (login user) is determined to be one of the sharing members and the process goes to Step S38.

In Step S38, the access control part 15 allows the temp staff EA to have access to the security image SI1*c*. In other words, the access control part 15 allows the temp staff EA to have access to the security image SI1*c* even if the temp staff EA does not enter the password (without requiring the temp staff EA to enter the password). With the access permission, the communication part 4 sends the security image SI1*c* to the temp agency CP which is the destination user via facsimile transmission.

When the login user is not determined to be one of the sharing members in Step S35, the image forming apparatus 1*b* requires the login user to enter the password for the security image in Step S36. Specifically, as shown in FIG. 12, a screen GA6 (for entering a password) which requires the login user to enter the password is displayed on the touch screen 63. In the screen GA6, when the temp staff EA enters the password and presses a button BT60, it is checked if the inputted password is authorized in the Step S37. If the inputted password is determined to be an authorized password, the process goes to Step S38, and if not, it is required again to enter the password.

With the above operation, the access control part 15 allows the temp staff EA (login user) to have access to the security image SI1*c* without requiring the temp staff EA (login user) to enter the password when the temp staff EA (login user) is determined to be one of the sharing members on the basis of the sharing member information CM1. Then, the communication part 4 sends the security image SI1*c* to the temp agency CP on the basis of the access permission (in other words, the grant of access authorization relating to the sending operation). Therefore, in the case of sending the scan image (e.g., the security manuscript SI1*c*) obtained by scanning the printed matter (for example, the security manuscript TS1*b*) with password for access control, the temp staff EA can send the scan image to the temp agency CP without entering the password. In other words, when the login user (temp staff EA) is one of the sharing members, the login user can access the security image (send the security image) without entering the password. Therefore, even a user who does not know the password can use the security image in which the password is set while ensuring security.

Further, such access control using the sharing members as discussed above is very useful especially in the following situation.

Specifically, when a password is set for a plurality of security images, there may be a situation where a user is allowed to have access to some of the plurality of security images. In such a situation, if the user is notified of the password, the user is allowed to have access not only to some of the security images but also to the others, and this disadvantageously lowers the security level on the other security images.

On the other hand, in accordance with the above-discussed aspect of the present invention, since it is not always necessary to notify each member of the password, the above problem can be avoided, and in other words, it is possible to avoid lowering the security level.

2. The Second Preferred Embodiment 2-1. Outline

The second preferred embodiment is a variation of the first preferred embodiment. Hereafter, discussion will be made centering on the difference between the first and second preferred embodiments.

The second preferred embodiment will be discussed taking a case where a "business report" is sent and received as a security manuscript. More specifically, discussion will be made on an exemplary case where a user UA (for example, a subordinate) generates a security manuscript (business report) and sends the security manuscript (business report) to a user UB (for example, a boss). Another exemplary case where the user UB who receives the security manuscript further sends the security manuscript to the user UA and a user UC (for example, a person in a relevant department) will be also discussed.

In the first preferred embodiment, discussion has been made on the case where the login user is allowed to have access to the scan image (security image) of the security manuscript without entering the password and can send the scan image (security image) when the login user is determined to be one of the sharing members on the basis of the sharing member information.

In the second preferred embodiment, discussion will be made on a case where a login user is allowed to have access to the scan image (security image) of the security manuscript without entering the password and can send the scan image (security image) when it is determined on the basis of the sharing member information that the login user is one of the sharing members and a destination user to whom the scan image (security image) of the security manuscript will be sent is also one of the sharing members.

Hereinafter, an operation of the user UA for generating the security image, an operation for sending the security manuscript from the user UA to the user UB, and an operation for sending the security manuscript from the user UB to the users UA and UC will be sequentially discussed.

Figure 20:
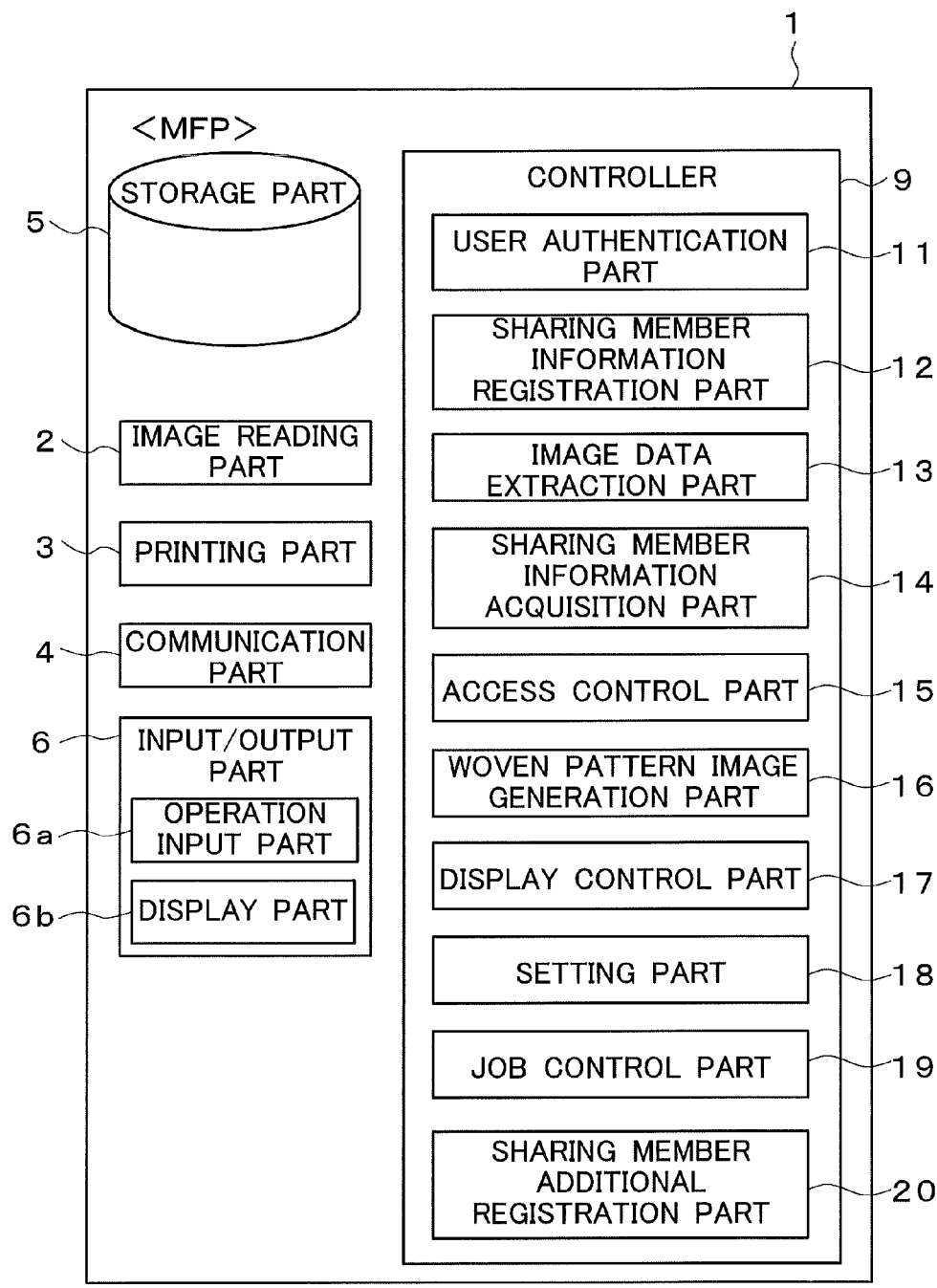
FIG. 20 is a diagram showing functional blocks of the image forming apparatus in accordance with the second preferred embodiment.

As to the operation for sending the security image from the user UB to the user UC, an additional registration process in which a new sharing member is registered as a user to be allowed to share the security image additionally to the already-registered sharing members will be also discussed. Such an additional registration process is performed by a sharing member additional registration part 20 of the controller 9 (also referred to as a "controller 9B") (see FIG. 20) in accordance with the second preferred embodiment and is also referred to as a sharing member information update process. The sharing member additional registration part 20 is an update part for additionally registering the destination user as a new one of the sharing members and updating the sharing member information in accordance with the operation input of the login user.

2-2. Operation for Generating Security Image

First, discussion will be made on an operation for generating a security image which is performed in the image forming apparatus 1*a*.

Figure 14:
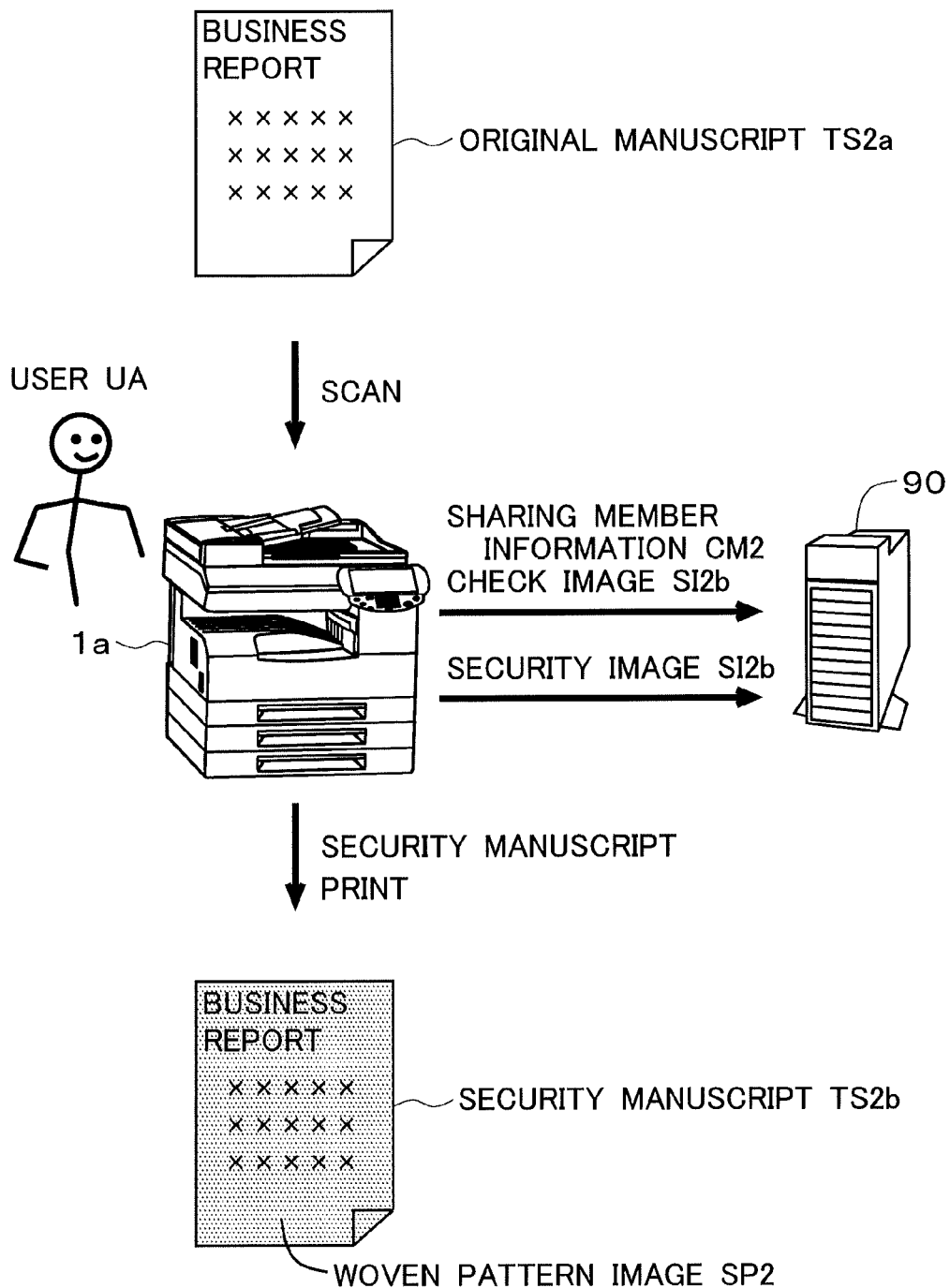
FIG. 14 is a conceptual diagram showing an operation of the image forming apparatus in accordance with the second preferred embodiment.

Hereinafter, discussion will be made on such an exemplary case as shown in FIG. 14, where the user UA uses the image forming apparatus 1*a* to generate a security image SI2*b* of a security manuscript TS2*a* relating to the business report, as one exemplary operation for generating a security image.

Specifically, like in the first preferred embodiment, the image forming apparatus 1*a* executes the process steps shown in the flowchart of FIG. 3, to thereby generate the security image SI2*b* of the security manuscript TS2*a* relating to the business report.

First, in Step S11, the user authentication process is executed, and the user UA thereby logs in to the image forming apparatus 1*a* as a login user.

In Step S12, a password (password for access control on the security image) to be embedded in a woven pattern image SP2 is set.

In Step S13, information on the sharing members who are users allowed to share the security image SI2*b* is set. Herein, taken is a case as an example, where the user UA sets the "user UA" and the "user UB" as the sharing member information.

In Step S14, the image reading part 2 reads the original manuscript TS2*a* to generate a scan image. Further, the woven pattern image generation part 16 generates the woven pattern image SP2 on the basis of the password set in Step S12 and overlays the scan image of the original manuscript TS2*a* on the woven pattern image SP2, to thereby generate the security image SI2*b*.

Figure 15:
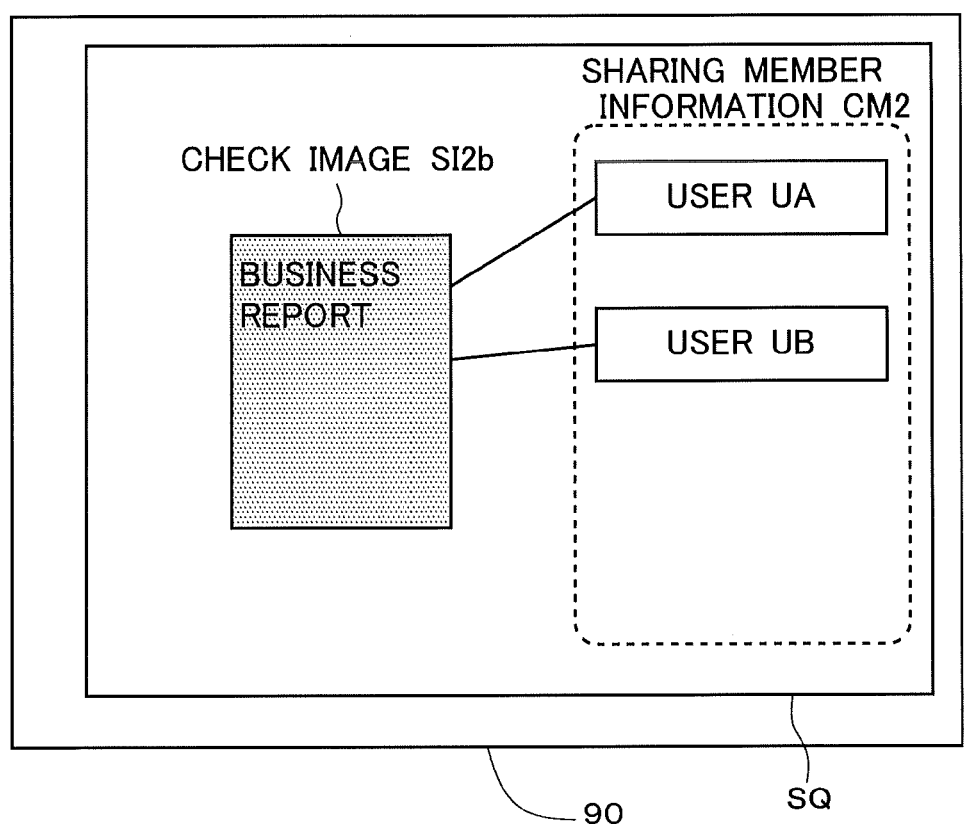
FIG. 15 is a conceptual diagram showing a check image and sharing member information.

In Step S15, the sharing member information registration part 12 registers a check image SI2*b* and sharing member information CM2, being associated with each other, into the storage part of the server 90, as shown in FIG. 15. Specifically, the sharing member information registration part 12 transmits the check image SI2*b* and the sharing member information CM2 to the server 90 and stores the image SI2*b* and the information CM2 into the database SQ provided in the server 90. The sharing member information CM2 is information on the users allowed to share the security image SI2*b* and specifically, is information on the sharing members set in Step S13.

Thus, the image forming apparatus 1*a* generates the security image SI2*b* on the basis of the original manuscript TS2*a* and stores the security image SI2*b* and the sharing member information CM2, being associated with each other, into the storage part of the server 90.

In this case, after that, the security manuscript TS2*b* based on the security image SI2*b* is printed out by the printing part 3 in accordance with the operation input of the user UA. Then, the security manuscript TS2*b* is used in the sending operation discussed next (the operation for sending the security manuscript from the user UA to the user UB). Specifically, the scan image (security image) obtained by scanning again the security manuscript TS2*b* as a printed matter is used as data to be sent.

In the second preferred embodiment, it is assumed that no access restriction using the password or the like is imposed on an operation for printing each security manuscript based on the corresponding security image. Accordingly, the users UA, UB, and the like can perform the printing operation without entering the password. On the other hand, the access restriction using the password or the like is imposed in principle on the operation for sending the security image accompanied by the operation of scanning the security manuscript. In more detail, as discussed later, the user UA can perform the sending operation accompanied by the scanning operation on condition that the user UA himself is one of the sharing members or enters the password.

This is, however, only one exemplary case and there may be another case where the same access restriction as in the sending operation is also imposed on the operation for printing each security manuscript based on the corresponding security image.

Further, in the second preferred embodiment, a case where the security manuscript TS2*b* is sent from the user UA to the user UB after being printed out and scanned will be discussed, but this is only one exemplary case and there may be another case where the security image SI2*b* itself is sent from the user UA to the user UB.

2-3. Operation for Sending Security Manuscript from User UA to User UB

Next, discussion will be made on an operation for sending the scan image of the security manuscript TS2*b* which is performed in the image forming apparatus 1a. In more detail, discussion will be made on an operation for sending the scan image of the security manuscript TS2b from the user UA to the user UB.

Figure 16:
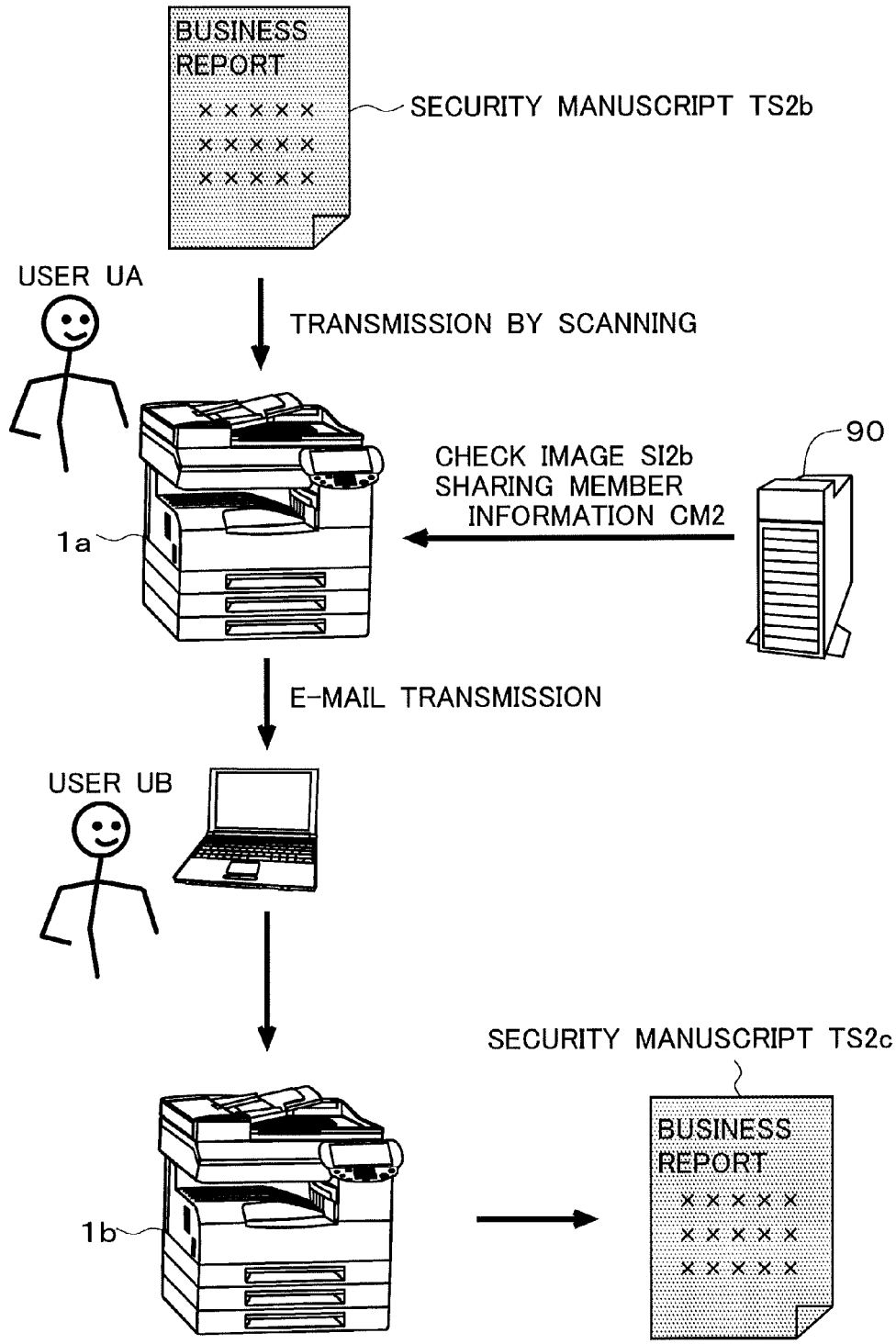
FIG. 16 is a conceptual diagram showing another operation of the image forming apparatus in accordance with the second preferred embodiment.

Hereinafter, discussion will be made on such a case as shown in FIG. 16 where the user UA uses the image forming apparatus 1a to send the scan image of the security manuscript TS2b attached to an electronic mail (E-mail) to the user UB (via E-mail transmission), as one exemplary operation for sending the scan image of the security manuscript TS2b.

Figure 13:
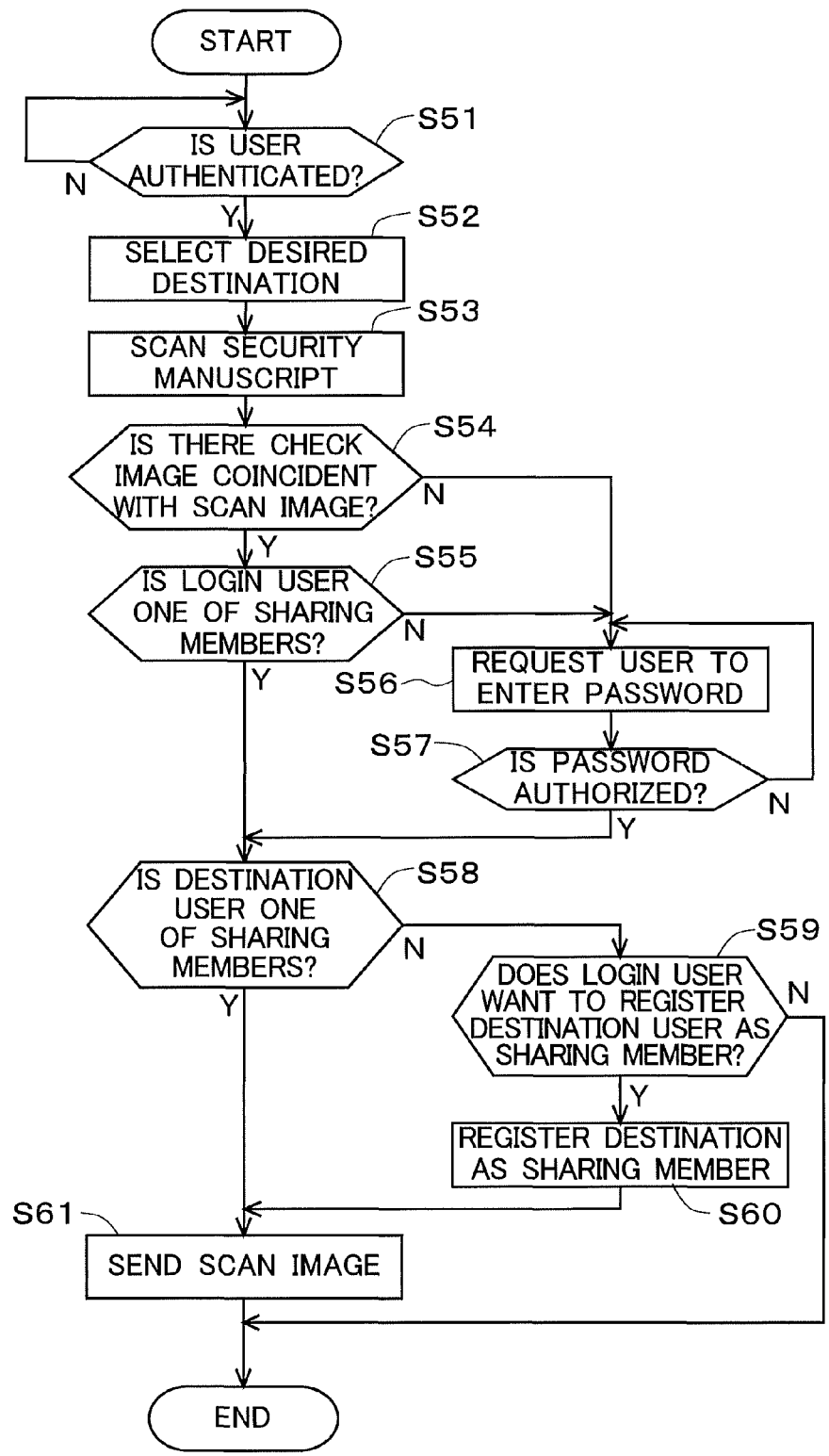
FIG. 13 is a flowchart showing an operation flow of an image forming apparatus in accordance with a second preferred embodiment.

FIG. 13 is a flowchart showing an operation flow for sending the scan image of the security manuscript in accordance with the second preferred embodiment. In FIG. 13, as can be seen from the comparison with FIG. 9, a process step (Step S58) for determining whether the destination user to whom the security image will be sent is one of the sharing members or not is additionally provided. Further, process steps (Steps S59 and S60) (discussed later) for additionally registering the destination user as the sharing member are inserted. The operations in Steps S51 to S57 and S61 in FIG. 13 correspond to those in Steps S31 to S37 and S38 in FIG. 9.

First, in Steps S51 to S57, the same operations as in Steps S31 to S37 are performed.

Specifically, in Step S51, the user authentication process (login process) for the user UA is executed, and the user UA thereby logs in to the image forming apparatus 1a as a login user.

In Step S52, the image forming apparatus 1a specifies a destination user to whom the scan image of the security manuscript TS2b will be sent. Herein, taken is a case as an example, where the user UA selects the "user UB" as the destination user.

In Step S53, the image reading part 2 reads the security manuscript TS2b to thereby generate a security image SI2c (not shown). Further, in Step S53, the image reading part 2 also extracts the password included in the security image SI2c (not shown).

In Step S54, the image data extraction part 13 extracts a check image SI2b which is determined to be identical to the security image SI2c. In Step S55, the sharing member information CM2 associated with the check image SI2b is acquired by the sharing member information acquisition part 14, and it is checked if the user UA (login user) is one of the sharing members on the basis of the sharing member information CM2. In the second preferred embodiment, in Step S15 of FIG. 3, the information on the user UA is associated with the check image SI2b as the sharing member information CM2 and registered (see FIG. 15). Therefore, in Step S55 of FIG. 13, the user UA (login user) is determined to be one of the sharing members and the process goes to Step S58.

In Step S58, the sharing member information acquisition part 14 acquires the sharing member information CM2 associated with the check image SI2 and it is determined whether or not the user UB (destination user) is one of the sharing members on the basis of the sharing member information CM2. In the second preferred embodiment, in Step S15 of FIG. 3, the "user UA" and the "user UB" are stored into the storage part of the server 90 as the sharing members relating to the sharing member information CM2 (see FIG. 5). Therefore, in Step S58, the user UB (destination user) is determined to be one of the sharing members and the process goes to Step S61.

In Step S61, the access control part 15 allows the user UA to have access to the security image SI2c. With the access permission, the communication part 4 sends the security image SI2c to the user UB who is the destination user (via E-mail transmission).

When a plurality of destination users are set in Step S52, the processes of Steps S58 to S61 are appropriately executed for each of the destination users.

With the above operation, the login user (herein, the user UA) can access the security image (send the security image) without entering the password on condition that the login user is one of the sharing members. Therefore, even a user who does not know the password can use the security image in which the password is set while ensuring security.

In more detail, the access control part 15 allows the user UA (login user) to have access to the security image SI2c without requiring the user UA (login user) to enter the password on condition that it is determined that the user UA (login user) is one of the sharing members and the user UB (destination user) is also one of the sharing members.

In other words, the access to the security image is allowed on condition that the destination user, as well as the login user, is one of the sharing members.

2-4. Operation for Sending Security Manuscript from User UB to Users UA and UC

Figure 17:
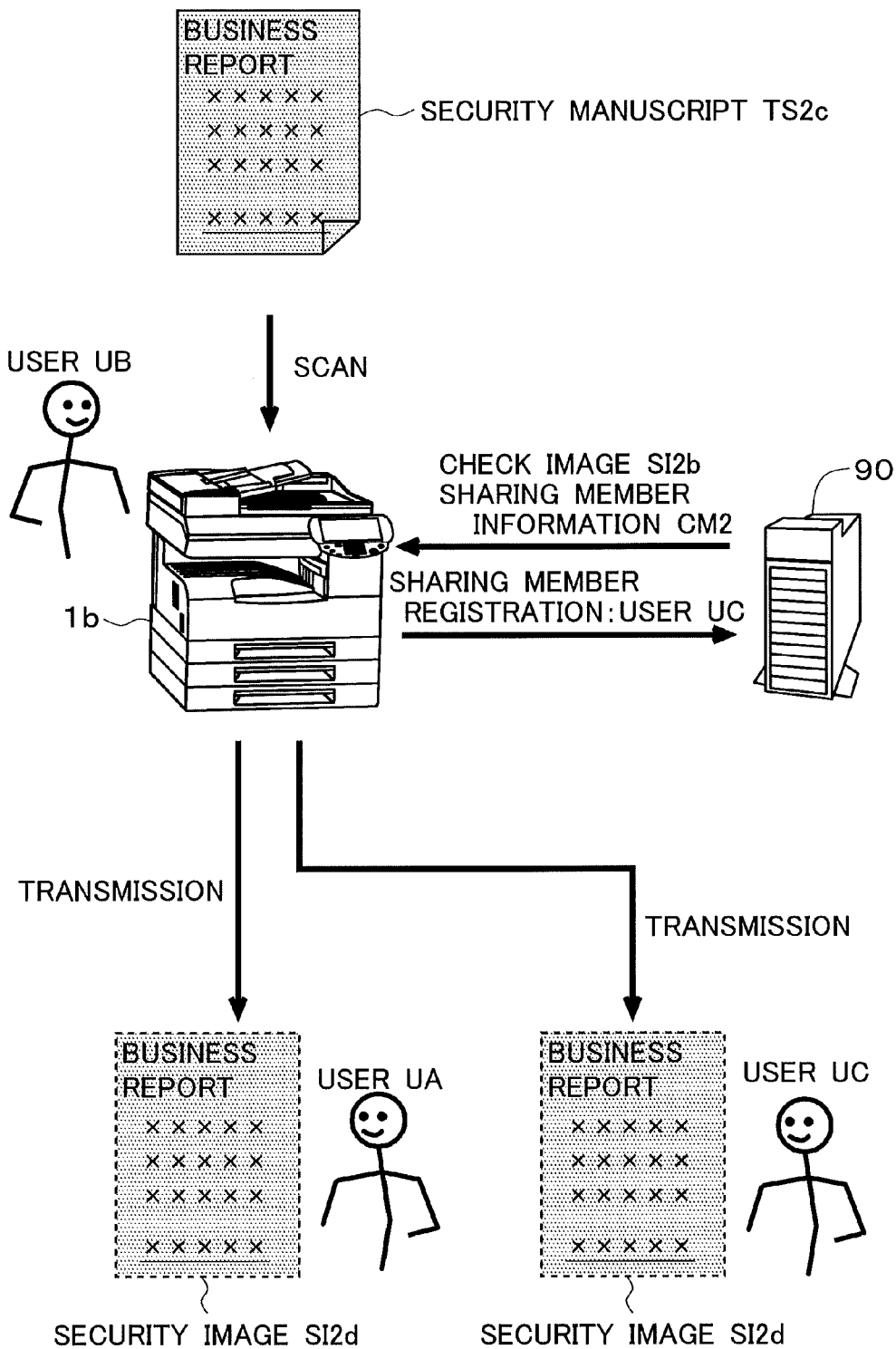
FIG. 17 is a conceptual diagram showing still another operation of the image forming apparatus in accordance with the second preferred embodiment.

Next, discussion will be made on such an operation as shown in FIG. 17 for sending a scan image of a security manuscript TS2c (described later) from the user UB to the users UA and UC, which is performed by the image forming apparatus 1b, and the like. Further, another discussion will be made on a sharing member additional registering operation for registering a destination user as a new sharing member to be added to the already-registered sharing members, which is performed when the destination user to whom the scan image of the security manuscript will be sent is not determined to be one of the sharing members.

Specifically, after receiving the security image SI2c attached to the E-mail, the user UB prints out the security image SI2c.

Further, the user UB handwrites necessary information and the like in the printed security manuscript TS2c, and then the user UB uses the image forming apparatus 1b to send the scan image of the security manuscript TS2c to the users UA and UC (for example, via E-mail transmission).

Such an operation for sending the scan image of the security manuscript TS2c as discussed above is carried out when the image forming apparatus 1b executes the process steps shown in FIG. 13.

Specifically, in Step S51, the user authentication process (login process) for the user UB is executed, and the user UB thereby logs in to the image forming apparatus 1b as a login user.

In Step S52, the image forming apparatus 1b sets destinations to whom the scan image of the security manuscript TS2c will be sent. Herein, taken is a case as an example, where the user UB selects the "user UA" and "user UC" as the destinations.

In Step S53, the image reading part 2 reads the security manuscript TS2c to thereby generate a scan image (hereinafter, also referred to as a "security image") SI2d. Further, in Step S53, the image reading part 2 extracts the password included in the security image SI2d.

In Step S54, performed is determination on coidentity between the security image and the check image. In this case, the image data extraction part 13 extracts the check image SI2b identical to the security image SI2d.

In Step S55, the sharing member information CM2 associated with the check image SI2b is acquired by the sharing member information acquisition part 14, and it is checked if the user UB (login user) is one of the sharing members on the basis of the sharing member information CM2. In the second preferred embodiment, in Step S15 of FIG. 3, the information on the user UB is associated with the check image SI2b as the sharing member information CM2 and registered (see FIG. 15). Therefore, in Step S55 of FIG. 13, the user UB (login user) is determined to be one of the sharing members and the process goes to Step S58. In other words, without requiring the login user to enter the password, the process goes to Step S58 and the following steps.

The process steps from Steps S58 to S61 are executed for each of the destination users UA and UC.

First, the process for the user UA will be discussed. In Step S58, the user UA is determined to be one of the sharing members on the basis of the sharing member information CM2 and the process goes to Step S61.

In Step S61, the access control part 15 allows the user UB to have access to the security image SI2d. With the access permission, the communication part 4 sends the security image SI2d to the user UA who is the destination user (via E-mail transmission).

Next, the process for the user UC will be discussed. In Step S58, the user UC is not determined to be one of the sharing members on the basis of the sharing member information CM2 and the process goes to Step S59.

Figure 18:
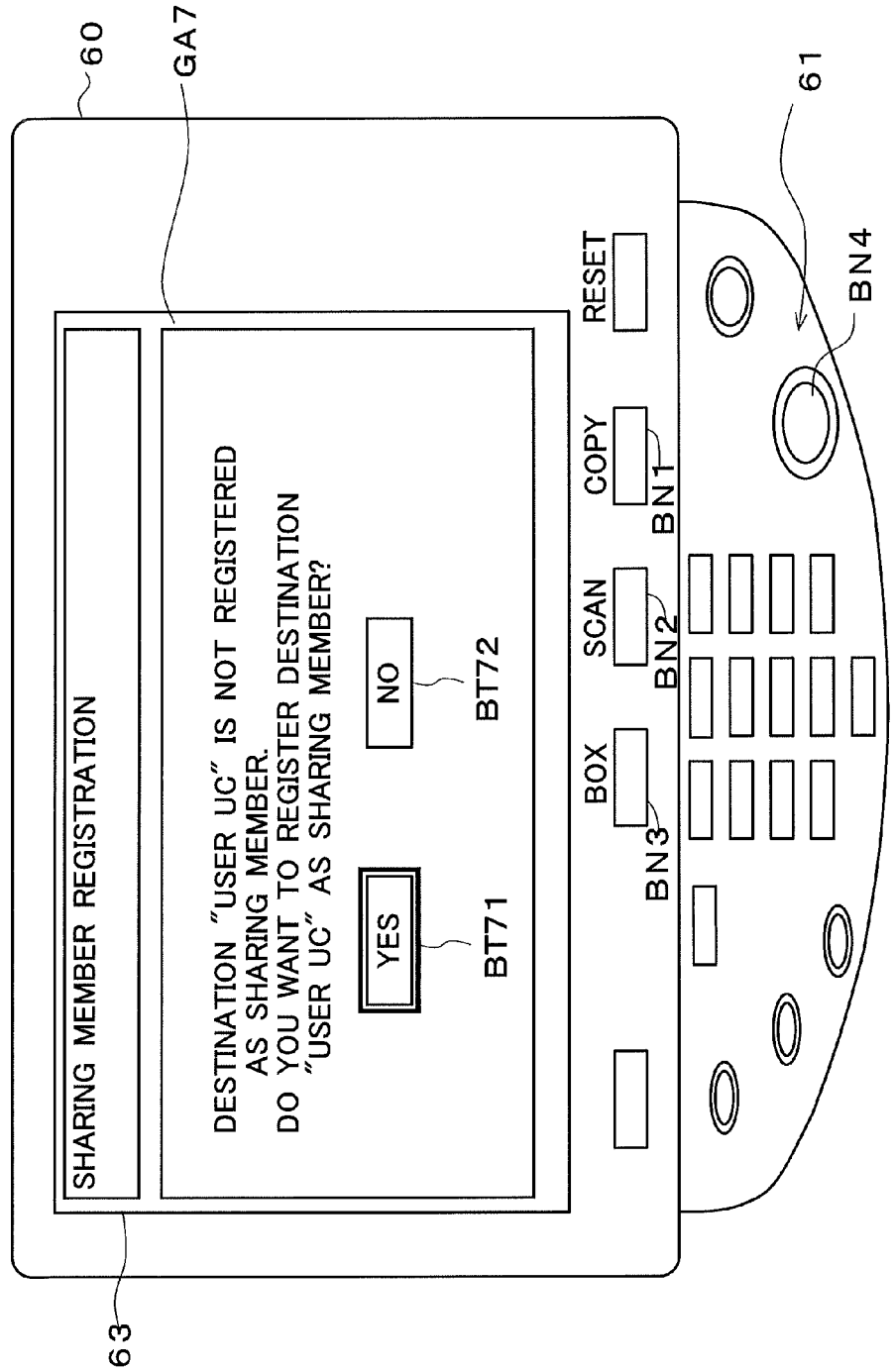
FIG. 18 is a view showing a display screen for additional registration of a sharing member.

In Step S59, the image forming apparatus 1b displays a screen GA7 for requiring additional registration of a sharing member on the touch screen 63 as shown in FIG. 18. In the screen GA7, as shown in FIG. 18, (virtual) buttons BT71 and BT72 corresponding to "YES" and "NO", respectively, are displayed.

Figure 19:
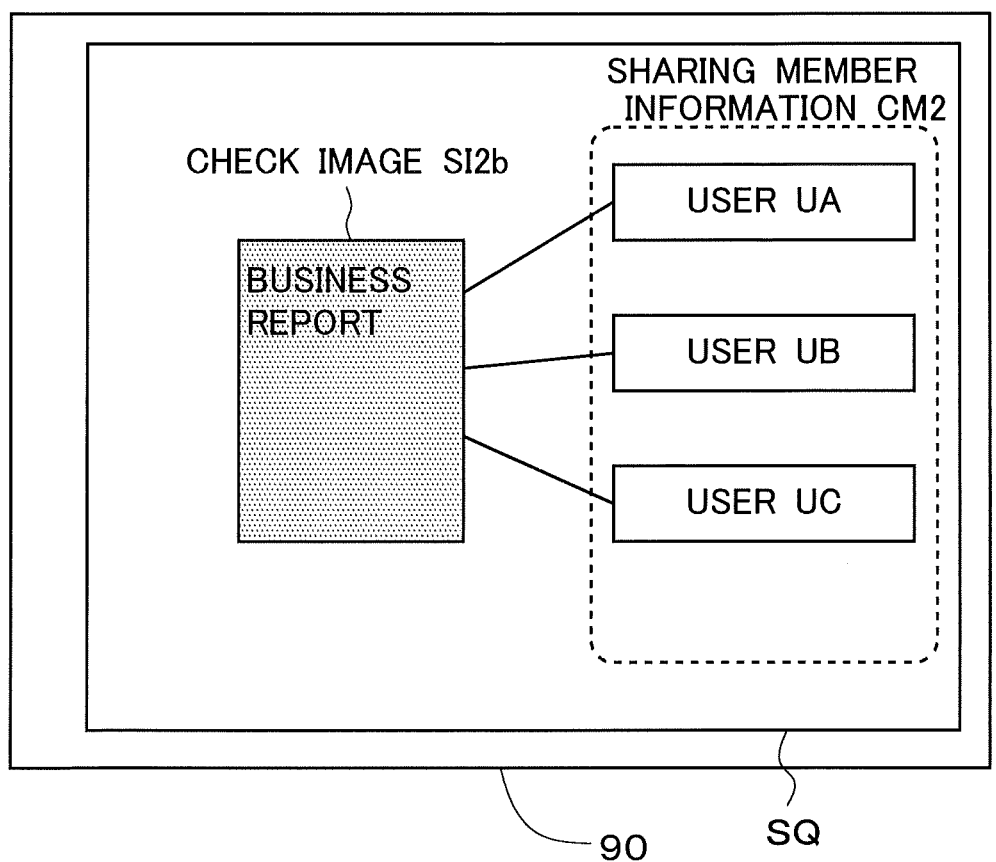
FIG. 19 is a conceptual diagram showing a check image and sharing member information.

When the button BT71 ("YES") is pressed in Step S59, the sharing member additional registration part 20 additionally registers the user UC as a new sharing member in the sharing member information CM2 in Step S60, as shown in FIG. 19. Then, the access control part 15 checks if the destination user UC is one of the sharing members on the basis of the updated sharing member information CM2.

After that, in Step S61, the access control part 15 allows the user UB to have access to the security image SI2d. With the access permission, the communication part 4 sends the security image SI2d also to the user UC who is the destination user (via E-mail transmission).

When the button BT72 ("NO") is pressed in Step S59, the access control part 15 prohibits the user UB from having access to the security image SI2d and the communication part 4 does not send the security image SI2d to the user UC. In other words, when the login user gives an instruction input indicating that he does not want to additionally register the user UC as a sharing member, the user UC will not be additionally registered as a sharing member, and the scan image (security image SI2d) of the security manuscript TS2c will not be sent to the user UC.

In accordance with the above-discussed operation, the login user (herein, the user UB) can have access to the security image (send the security image) without entering the password on condition that the login user is one of the sharing members. Therefore, even a user who does not know the password can use the security image in which the password is set while ensuring security.

In more detail, the access control part 15 allows the login user UB to have access to the security image SI2d without requiring the login user UB to enter the password on condition that it is determined that the login user UB is one of the sharing members and the destination user is also one of the sharing members. On the other hand, when the destination user UC is not one of the sharing members, if the password is not entered, access to the security image SI2d is prohibited in principle. Thus, since the permission/prohibition of access to the security image is determined depending on whether the destination user, as well as the login user, is one of the sharing members or not, higher security level can be ensured as compared with the case where the permission/prohibition of access to the security image is determined only depending on whether the login user is one of the sharing members or not.

Further, in accordance with the above-discussed operation, the login user UB can additionally register the destination user UC who is not one of the sharing members as a new sharing member by the login user's operation input on condition that the login user UB is one of the sharing members. Therefore, the security image can be sent to the destination user while ensuring security, and this allows flexible handling. Particularly, since additional registration is allowed on condition that the login user UB is one of the sharing members, it is possible to avoid lowering the security level.

3. Variations

The preferred embodiments of the present invention have been discussed above, but the present invention is not limited to the above-discussed exemplary cases.

In the above-discussed preferred embodiments, for example, the exemplary case where the check image is stored alone in the storage part of the server 90, as shown in FIGS. 5 and 15, has been discussed, but the present invention is not limited to this case. Specifically, a plurality of images including the check image may be stored in the storage part of the server 90. In such a case, the image data extraction part 13 has only to extract the check image out of the plurality of images on the basis of the determination result on coidentity between the security image and each of the plurality of images including the check image.

Further, in the above-discussed preferred embodiments, the exemplary case where the sharing member information and the check image are stored in the storage part of the server 90, being associated with each other, has been discussed, but the present invention is not limited to this case. For example, the sharing member information and the check image may be stored in the storage part 5 of the image forming apparatus 1, being associated with each other.

Furthermore, in the above-discussed preferred embodiments, the exemplary case where the security image obtained by overlaying the scan image on the woven pattern image is used as the check image has been discussed, but the present invention is not limited to this case. For example, the scan image before being overlaid on the woven pattern image (i.e., the image not including the woven pattern image) may be used as the check image.

Though the exemplary case where the scan image (security image) is sent via facsimile transmission has been discussed in the first preferred embodiment and the exemplary case where the scan image (security image) is sent via E-mail transmission has been discussed in the second preferred embodiment, the present invention is not limited to these cases. For example, the scan image (security image) may be sent via FTP transmission.

In the above-discussed preferred embodiments, the exemplary case where the password is embedded in the woven pattern image included in the security manuscript has been discussed, but the present invention is not limited to this case. For example, the password may be embedded in a bar code (two-dimensional bar code or the like) included in the security manuscript.

While the invention has been shown and described in detail, the foregoing description is in all aspects illustrative and not restrictive. It is therefore understood that numerous modifications and variations can be devised without departing from the scope of the invention.

What is claimed is:

1. An image forming system, comprising:
    an access control part for determining whether to allow or prohibit access to a security image in which a password for access control is embedded;
    a storage part for storing a check image, which is an image for checking said security image, and sharing member information which is information on sharing members who are users allowed to share said security image, being associated with each other;
    an extraction part for extracting said check image which is determined to have coidentity with said security image, out of one or more images including said check image stored in said storage part, on the basis of a determination result on coidentity between said security image and each of said one or more images; and
    an acquisition part for acquiring said sharing member information associated with said check image,
    wherein said access control part allows a login user who logs in to said image forming system to have access to said security image without requiring said login user to enter said password on condition that said login user is determined to be one of said sharing members on the basis of said sharing member information.

2. The image forming system according to claim 1, further comprising:
    a transmission part for sending said security image to a destination user specified by said login user,
    wherein said access control part allows said login user to have access to said security image without requiring said login user to enter said password on condition that said login user is determined to be one of said sharing members and said destination user is also determined to be one of said sharing members on the basis of said sharing member information, and
    said transmission part sends said security image to said destination user on condition that said access control part allows access to said security image.

3. The image forming system according to claim 2, further comprising:
    an update part for additionally registering said destination user as a new member of said sharing members in accordance with an operation input of said login user, to thereby update said sharing member information, on condition that said login user is determined to be one of said sharing members on the basis of said sharing member information,
    wherein said access control part determines whether said destination user is one of said sharing members or not on the basis of said updated sharing member information.

4. The image forming system according to claim 3, wherein said security image is sent to said destination user via one of facsimile transmission, E-mail transmission, and FTP transmission.

5. The image forming system according to claim 3, wherein said security image is at least one of a first security image and a second security image which is an image obtained by reading a security manuscript which is a printed matter of said first security image.

6. The image forming system according to claim 2, wherein said security image is sent to said destination user via one of facsimile transmission, E-mail transmission, and FTP transmission.

7. The image forming system according to claim 6, wherein said security image is at least one of a first security image and a second security image which is an image obtained by reading a security manuscript which is a printed matter of said first security image.

8. The image forming system according to claim 2, wherein said security image is at least one of a first security image and a second security image which is an image obtained by reading a security manuscript which is a printed matter of said first security image.

9. The image forming system according to claim 1, wherein said security image is at least one of a first security image and a second security image which is an image obtained by reading a security manuscript which is a printed matter of said first security image.

10. An image forming apparatus, comprising:
    an access control part for determining whether to allow or prohibit access to a security image in which a password for access control is embedded; and
    an acquisition part for acquiring sharing member information which is information on sharing members who are registered in advance as users allowed to share said security image,
    wherein said sharing member information is associated with and stored together with a check image which is generated in advance as an image for checking said security image in an operation for generating said security image,
    said acquisition part acquires said sharing member information associated with said check image extracted on the basis of determination result on coidentity with said security image, and
    said access control part allows a login user who logs in to said image forming system to have access to said security image without requiring said login user to enter said password on condition that said login user is determined to be one of said sharing members on the basis of said sharing member information.

11. The image forming apparatus according to claim 10, further comprising:
    a storage part for storing said sharing member information and said check image, being associated with each other.

12. The image forming apparatus according to claim 11, wherein
    said security image is at least one of a first security image and a second security image which is an image obtained by reading a security manuscript which is a printed matter of said first security image.

13. The image forming apparatus according to claim 10, wherein
    said sharing member information and said check image are stored in an external device connected to said image forming apparatus via a network, and
    said acquisition part acquires said sharing member information by communicating with said external device.

14. The image forming apparatus according to claim 13, wherein
    said security image is at least one of a first security image and a second security image which is an image obtained by reading a security manuscript which is a printed matter of said first security image.

15. The image forming apparatus according to claim 10, further comprising:
    a transmission part for sending said security image to a destination user specified by said login user,
    wherein said access control part allows said login user to have access to said security image without requiring said login user to enter said password when said login user is determined to be one of said sharing members and said destination user is also determined to be one of said sharing members on the basis of said sharing member information, and said transmission part sends said security image to said destination user when said access control part allows access to said security image.

16. The image forming apparatus according to claim 15, further comprising:
an update part for additionally registering said destination user as a new member of said sharing members in accordance with an operation input of said login user, to thereby update said sharing member information, on condition that said login user is determined to be one of said sharing members on the basis of said sharing member information,
wherein said access control part determines whether said destination user is one of said sharing members or not on the basis of said updated sharing member information.

17. The image forming apparatus according to claim 15, wherein
said security image is sent to said destination user via at least one of facsimile transmission, E-mail transmission, and FTP transmission.

18. The image forming apparatus according to claim 10, wherein
said security image is at least one of a first security image and a second security image which is an image obtained by reading a security manuscript which is a printed matter of said first security image.

* * * * *